United States Patent
Amicangioli et al.

(10) Patent No.: US 11,483,087 B2
(45) Date of Patent: Oct. 25, 2022

(54) SYSTEMS AND METHODS FOR CLOCK SYNCHRONIZATION USING SPECIAL PHYSICAL LAYER CLOCK SYNC SYMBOLS

(71) Applicant: Hyannis Port Research, Inc., Needham, MA (US)

(72) Inventors: Anthony D. Amicangioli, Newton, MA (US); Allen Bast, Sharon, MA (US); B. Joshua Rosen, Westford, MA (US)

(73) Assignee: Hyannis Port Research, Inc., Needham, MA (US)

( * ) Notice: Subject to any disclaimer, the term of this patent is extended or adjusted under 35 U.S.C. 154(b) by 141 days.

(21) Appl. No.: 16/988,037

(22) Filed: Aug. 7, 2020

(65) Prior Publication Data

US 2022/0045777 A1  Feb. 10, 2022

(51) Int. Cl.
*H04J 3/06* (2006.01)
*G06F 1/12* (2006.01)
*G06F 1/14* (2006.01)

(52) U.S. Cl.
CPC .............. *H04J 3/0667* (2013.01); *G06F 1/12* (2013.01); *G06F 1/14* (2013.01); *H04J 3/067* (2013.01)

(58) Field of Classification Search
CPC ........... H04J 3/0667; H04J 3/067; G06F 1/12; G06F 1/14
See application file for complete search history.

(56) References Cited

U.S. PATENT DOCUMENTS 5,995,512 A * 11/1999 Pogue, Jr. ............... H04L 29/06
                                                              370/420
6,697,331 B1   2/2004 Riihinen et al.
(Continued)

FOREIGN PATENT DOCUMENTS

EP      3496344 A1    6/2019
JP      2019050013 A  3/2019
(Continued)

OTHER PUBLICATIONS

International Search Report and Written Opinion received for PCT Patent Application No. PCT/US21/44617, dated Dec. 8, 2021, 13 pages.
Determinism is the new latency, Arista.com, Solution Brief, 3 pages.
"ICON Deterministic Packet Transport," SEL Schweitzer Engineering Laboratories, 4 pages.
(Continued)

*Primary Examiner* — Walter J Divito
*Assistant Examiner* — Anthony Luo
(74) *Attorney, Agent, or Firm* — Gesmer Updegrove LLP

(57) ABSTRACT

Systems and methods for clock synchronization are disclosed in which a primary node generates special physical layer clock sync symbols from the output of a reference clock and inserts the clock sync symbols within a symbol stream to one or more secondary nodes. Upon receiving a symbol stream, a secondary node can extract the clock sync symbols from the stream to synchronize its local clock with the reference clock of the primary node. In particular, the clock sync symbols can be inserted into the symbol stream at any arbitrary symbol location, e.g., even between consecutive symbols of a symbol encoded data frame. The clock sync symbols can also replace some control symbols in the symbol stream, such as idle or comma symbols. Accordingly, the clock sync symbols can be inserted into a symbol stream at fixed intervals, irregular intervals, or at any arbitrary time for high resolution clock synchronization.

32 Claims, 17 Drawing Sheets

(56) References Cited

U.S. PATENT DOCUMENTS

| | | | |
|---|---|---|---|
| 7,023,833 | B1 | 4/2006 | Aiello et al. |
| 7,496,086 | B2 | 2/2009 | Eckberg |
| 7,720,043 | B2 | 5/2010 | Meylan et al. |
| 7,876,740 | B2 | 1/2011 | Eastwood et al. |
| 7,876,751 | B2 | 1/2011 | Benner et al. |
| 7,885,296 | B2 | 2/2011 | Biederman et al. |
| 8,923,341 | B2 | 12/2014 | Barnette et al. |
| 9,691,102 | B2 | 6/2017 | Studnitzer et al. |
| 9,712,606 | B2 | 7/2017 | Farnlof et al. |
| 9,929,743 | B1 | 3/2018 | Acuna-Rohter et al. |
| 10,104,148 | B2 | 10/2018 | Yang et al. |
| 10,262,365 | B2 | 4/2019 | Venkataraman |
| 10,417,709 | B2 | 9/2019 | Hosman et al. |
| 10,467,693 | B2 | 11/2019 | Studnitzer et al. |
| 10,585,729 | B2 | 3/2020 | Vaccaro et al. |
| 10,637,967 | B2 | 4/2020 | Bonig et al. |
| 10,699,336 | B2 | 6/2020 | Burkhardt et al. |
| 2003/0065974 | A1 | 4/2003 | Lam et al. |
| 2003/0235209 | A1 | 12/2003 | Garg et al. |
| 2004/0120303 | A1* | 6/2004 | Kloos .................. H04B 7/2643 370/347 |
| 2004/0246897 | A1 | 12/2004 | Ma et al. |
| 2007/0255855 | A1 | 11/2007 | Knapp et al. |
| 2008/0069118 | A1 | 3/2008 | Monier |
| 2008/0084833 | A1 | 4/2008 | Picard |
| 2009/0034654 | A1* | 2/2009 | Inukai .................. H04B 7/2125 375/299 |
| 2010/0046368 | A1 | 2/2010 | Kaempfer et al. |
| 2010/0318673 | A1 | 12/2010 | Kemp, II et al. |
| 2011/0006818 | A1 | 1/2011 | Takagi et al. |
| 2011/0194409 | A1 | 8/2011 | Ofelt et al. |
| 2011/0264577 | A1 | 10/2011 | Winbom et al. |
| 2012/0044940 | A1 | 2/2012 | Katz et al. |
| 2012/0093022 | A1 | 4/2012 | Wang |
| 2012/0131221 | A1 | 5/2012 | Foygel et al. |
| 2012/0195203 | A1 | 8/2012 | Godbole et al. |
| 2012/0317011 | A1 | 12/2012 | Duuquette |
| 2015/0222413 | A1* | 8/2015 | Pietilainen ................ G06F 1/14 709/248 |
| 2015/0341422 | A1 | 11/2015 | Färnlöf et al. |
| 2015/0356679 | A1 | 12/2015 | Schmitt |
| 2016/0294921 | A1 | 10/2016 | Meng et al. |
| 2017/0006567 | A1 | 1/2017 | Hu et al. |
| 2017/0127341 | A1 | 5/2017 | Di Marco et al. |
| 2017/0208558 | A1* | 7/2017 | Gao .................. H04W 56/0015 |
| 2017/0236203 | A1 | 8/2017 | Amicangioli |
| 2018/0069650 | A1* | 3/2018 | Tran .................. H04K 3/68 |
| 2018/0115529 | A1* | 4/2018 | Munger .............. H04L 63/0227 |
| 2018/0167492 | A1 | 6/2018 | Bonig et al. |
| 2018/0279934 | A1 | 10/2018 | Wo et al. |
| 2018/0359195 | A1 | 12/2018 | Shah et al. |
| 2019/0097745 | A1 | 3/2019 | Mallela et al. |
| 2019/0222442 | A1 | 7/2019 | Wei et al. |
| 2019/0259099 | A1 | 8/2019 | Katsuyama et al. |
| 2019/0349309 | A1 | 11/2019 | Bonig et al. |
| 2019/0379768 | A1 | 12/2019 | Amicangioli et al. |
| 2020/0034929 | A1 | 1/2020 | Rao et al. |
| 2020/0134720 | A1 | 4/2020 | Katsuyama et al. |
| 2020/0167865 | A1 | 5/2020 | Craig et al. |
| 2020/0169355 | A1 | 5/2020 | McIlroy |
| 2020/0187274 | A1 | 6/2020 | Rune et al. |

FOREIGN PATENT DOCUMENTS

| | | |
|---|---|---|
| WO | 2012144999 A2 | 10/2012 |
| WO | 2018106350 A1 | 6/2018 |

OTHER PUBLICATIONS

Geng et al., Requirements of Layer 3 Deterministic Latency Service draft-geng-detnet-requirements-bounded-latency-03, Retrieved from tools.ietf.org/html/draft-geng-detnet-requirements-bounded-latency-03 on Jul. 2019, 9 pages.

Configuring Queuing and Flow Control, Cisco Nexus 5000 Series NX-OS Quality of Service Configuration Guide, Release 5.2(1)N1(1).

Qui et al., Hierarchy Virtual Queue Based Flow Control in LTE/SAE, 2010 Second International Conference on Future Networks, pp. 78-82, 2010.

* cited by examiner

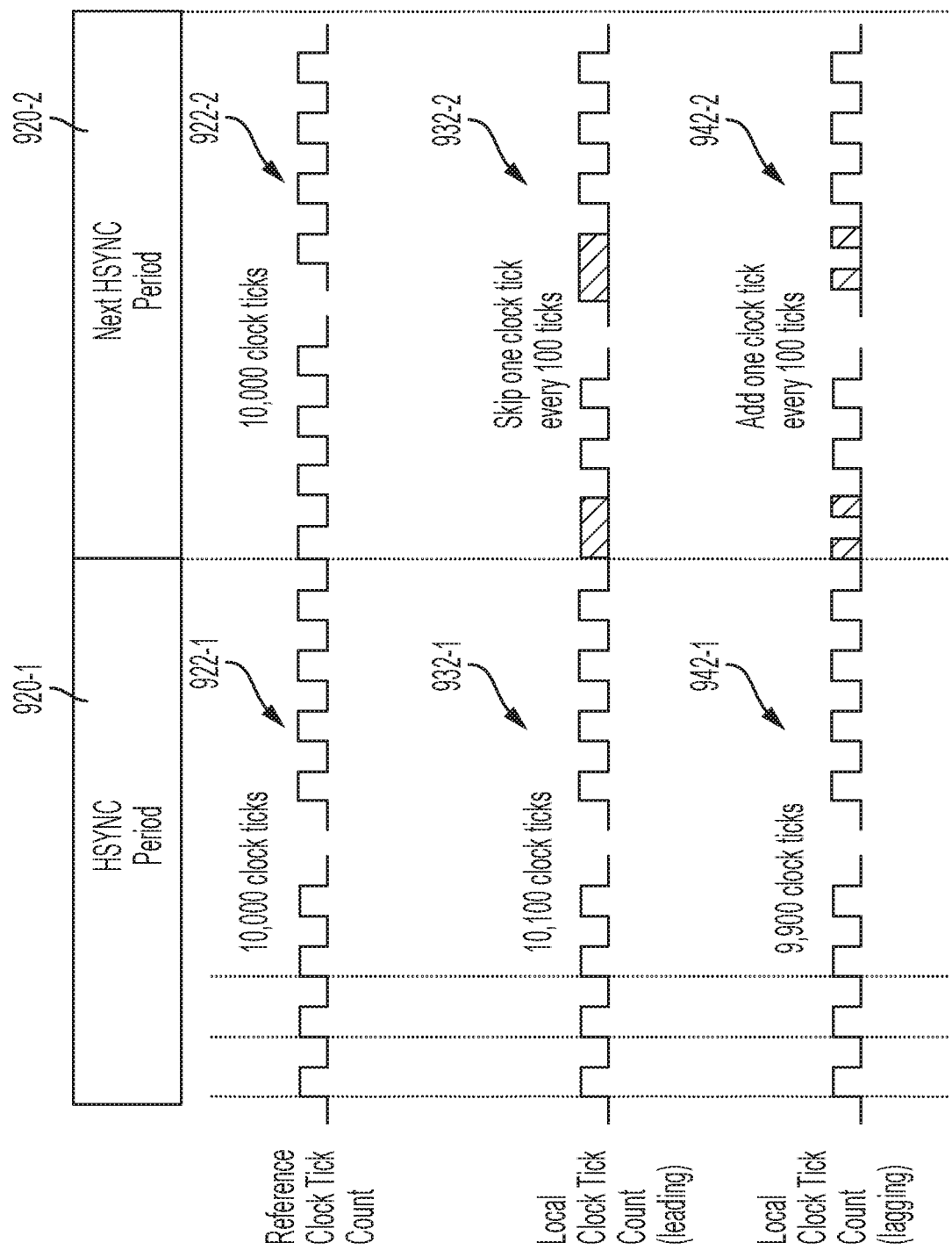

US 11,483,087 B2

SYSTEMS AND METHODS FOR CLOCK SYNCHRONIZATION USING SPECIAL PHYSICAL LAYER CLOCK SYNC SYMBOLS

TECHNICAL FIELD

Systems and methods described herein relate to clock synchronization in distributed computing systems, and more particularly to systems and methods for clock synchronization that involve transmission and processing of special physical layer clock sync symbols.

BACKGROUND

Clocks are used in nearly all electronic devices for various time keeping purposes. For example, servers, databases, personal computers, mobile devices, transceivers and other communication devices, interconnect devices such as routers and switches, among others, include some form of a clock for regulating their timing and speed. Clocks can also be used for controlling the application-specific operations, including without limitation time logging, task execution, work flow sequencing, and many others.

For some applications, precise timekeeping can be very important. For example, since the inception of direct electronic trading of financial instruments in the 1970s, the speed of financial market transactions has increased at an exponential rate. Presently, trading decisions are made and trades executed in microseconds, and in some cases faster, e.g., in nanoseconds. Financial markets now operate as high-performance distributed computing systems where the timestamp of any particular trade can have an influence on the financial fortunes of investors. Recording each transaction with an accurate time stamp is an important part of operating a fair and equitable financial market. The Securities Exchange Commission (SEC) in the United States and EWA in the European Union promulgate precise timekeeping requirements. To meet these precise timekeeping requirements, computing nodes involved in the operations of an electronic trading system must continually evolve.

Electronic trading systems and other distributed computing systems frequently rely on high resolution clocks, such as GPS type atomic clocks, to keep accurate time. However, GPS clocks are expensive, often including recurring subscription costs. Thus, it can be cost prohibitive to provide a GPS clock in every computing node of a distributed computing system to ensure accurate time.

Conventional clock synchronization protocols, such as Network Time Protocol (NTP) and Precision Time Protocol (PTP), typically transmit data packets that encapsulate time information from a time server. These conventional clock sync data packets are typically processed according to one or more upper layer communication protocols (e.g., UDP/IP). Accordingly, existing clock synchronization protocols typically incur the significant processing overhead and bandwidth utilization that may limit their usefulness for certain types of applications, including but not limited to electronic trading systems.

Accordingly, there is a need for improved systems and methods for high resolution clock synchronization across computing nodes in distributed computing systems.

SUMMARY

The present disclosure is generally related to systems and methods of clock synchronization, and represents improvements over conventional clock synchronization protocols.

One example method of clock synchronization includes generating, by a primary node, a clock sync symbol based on an output of a reference clock of the primary node; generating, by the primary node, a symbol stream for transmission over a connection to a secondary node; and inserting, by the primary node, the clock sync symbol at any arbitrary symbol location within the symbol stream for transmission to the secondary node. The clock sync symbol can be at least one of a 64/66 bit encoded symbol and an 8/10 bit encoded symbol. In some embodiments, insertion of a clock sync symbol at any arbitrary symbol location within a symbol stream can include inserting the clock sync symbol between any two consecutive data symbols of a symbol encoded frame; inserting the clock sync symbol between any two consecutive symbols of the frame without recalculating an error-detecting code of the encoded frame; and/or inserting a further clock sync symbol at a symbol location adjacent to a start of a symbol encoded frame or adjacent to an end of the symbol encoded frame. In some embodiments, insertion of a clock sync symbol at any arbitrary symbol location within a symbol stream can alternatively or additionally include suppressing transmission of another control symbol within the symbol stream to insert the clock sync symbol at the symbol location. Example control symbols can include an idle symbol, a comma symbol, or other control symbol used in Ethernet communications and/or other similar control symbols used in other data communication protocols.

The method can further include receiving, by the secondary node, the symbol stream from the data connection; extracting, by the secondary node, the clock sync symbol from the symbol stream; and synchronizing, by the secondary node, a local clock of the secondary node to the reference clock of the primary node based on the extracted clock sync symbol.

In one example embodiment, synchronizing the local clock of the secondary node with the reference clock of the primary node can include generating a sync pulse; determining a phase error between the sync pulse and a clock pulse of the local clock; and adjusting a phase of a next clock pulse of the local clock based on the determined phase error. The phase of the sync pulse can be adjusted based on a transmit latency associated with the data connection In another example embodiment, synchronizing the local clock of the secondary node to the reference clock of the primary node can include adjusting a local time counter of the local clock based on time information encoded in the clock sync symbol. In some embodiments, the time information can be based on an output of the reference clock, and the local time counter can be adjusted by adding or skipping one or more clock ticks to the local time counter.

In still another example embodiment, synchronizing the local clock of the secondary node to the reference clock of the primary node can include overwriting the local time counter with a reference timestamp encoded as time information in the clock sync symbol. In some embodiments, the local time counter can be further adjusted based on the reference timestamp and a transmit latency associated with the data connection.

In any of the foregoing embodiments, the local time counter of the local clock can be synchronized to have a clock tick accuracy in a range of zero to ten clock ticks of a reference time counter of the reference clock. Preferably, the local time counter of the local clock can be synchronized to have a clock tick accuracy in a range of zero to two clock ticks of a reference time counter.

The example method can further include generating, by a further primary node, a further clock sync symbol based on an output of a reference clock of the further primary node; generating, by the further primary node, a symbol stream for transmission over a data connection; and inserting, by the further primary node, the further clock sync symbol at any arbitrary symbol location within the symbol stream during transmission over the data connection.

The method can further include the secondary node receiving the clock sync symbol from the primary node and the further clock sync symbol from the further primary node; and the secondary node synchronizing a local clock of the secondary node using one of the clock sync symbol and the further clock sync symbol that is selected based on preconfigured priorities of the primary node and the at least one further primary node.

In some embodiments, the method can further include, at the primary node, waiting for an acknowledgment of the clock sync symbol from the secondary node during a compatibility mode; and continuing to generate and insert clock sync symbols into symbol streams transmitted over the data connection to the secondary node only in response to receiving the acknowledgment of the clock sync symbol. In some embodiments, either the primary node or a secondary node can measure a transmit latency associated with the data connection based on a delay between transmitting the clock sync symbol over the data connection and receiving the acknowledgment from the secondary node.

Another example method of clock synchronization includes generating, by the primary node, a plurality of symbol streams for transmission over a plurality of data connections to a plurality of respective secondary nodes; and inserting, by the primary node, the clock sync symbol at an any arbitrary symbol location within each symbol stream for transmission to each secondary node.

Example embodiments are also disclosed for a clock synchronization system that includes a primary node comprising a reference clock and a processor that executes a transmit engine. The transmit engine can be executed to generate a clock sync symbol from an output of the reference clock, generate a symbol stream for transmission over a data connection, and insert the clock sync symbol at any arbitrary symbol location within the symbol stream for transmission over the connection. The clock sync symbol is at least one of a 64/66 bit encoded symbol and an 8/10 bit encoded symbol.

In some embodiments, the transmit engine can insert the clock sync symbol between any two consecutive symbols of a symbol encoded frame. In some embodiments, the transmit engine can insert a further clock sync symbol at a symbol location adjacent to a start of a symbol encoded frame or adjacent to an end of the symbol encoded frame. In some embodiments, the transmit engine can suppress transmission of another control symbol to insert the clock sync symbol within the symbol stream.

The clock synchronization system can further include a secondary node comprising a local clock and a processor that executes a receive engine. The receive engine can be executed to receive the symbol stream from the data connection, extract the clock sync symbol from the symbol stream, and synchronize the local clock of the second node with the reference clock of the primary node based on the extracted clock sync symbol.

In one example embodiment, to synchronize the local clock of the secondary node with the reference clock of the primary node; the receive engine can generate a sync pulse, determine a phase error between the sync pulse and a clock pulse of the local clock, and adjust a phase of a next clock pulse of the local clock based on the determined phase error. The receive engine can further adjusts a phase of the sync pulse based on a transmit latency associated with the data connection.

In another example embodiment, the clock sync symbol can encode time information based on an output of the reference clock. The receive engine can adjust a local time counter of the local clock based on the time information encoded in the clock sync symbol. For example, in some embodiments, the local time counter of the local clock can be adjusted by adding or skipping one or more clock ticks. In some embodiments, the time information can include a reference timestamp and the local time counter can be adjusted by overwriting the local time counter with the reference timestamp. The receive engine can further adjust the local time counter based on the reference timestamp and a transmit latency associated with the data connection.

In some embodiments, the transmit engine can include a modified physical coding sublayer (PCS) transmit engine and the receive engine can include a modified PCS receive engine.

BRIEF DESCRIPTION OF THE DRAWINGS

The foregoing will be apparent from the following more particular description of example embodiments, as illustrated in the accompanying drawings in which like reference charters refer to the same parts throughout the different views. The drawings are not necessarily to scale, emphasis instead being placed upon illustrating these example embodiments.

FIGS. 9A and 9B are schematic diagrams that illustrate a clock sync processor or other fixed logic that uses the clock sync symbols to synchronize a local clock according to another embodiment.

DETAILED DESCRIPTION

Figure 1:
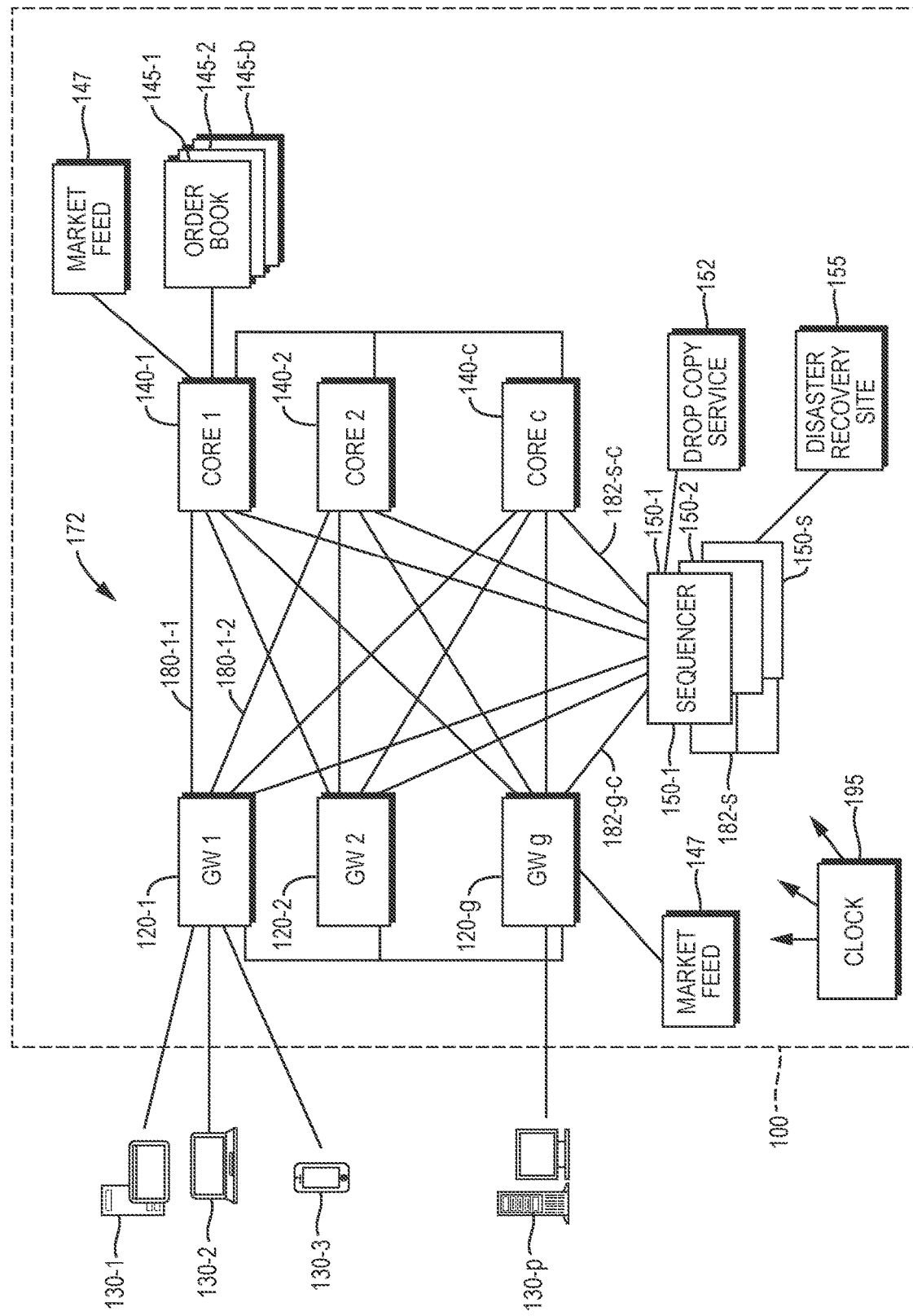
FIG. 1 is a schematic diagram that illustrates an example embodiment of an electronic trading system.

Certain example embodiments will now be described to provide an overall understanding of the principles of the structure, function, and use of the systems, methods and devices disclosed herein. One or more examples of these embodiments are illustrated in the accompanying drawings. Those skilled in the art will understand that the systems, methods and devices specifically described herein and illustrated in the accompanying drawings are non-limiting, examples and that the scope of the present disclosure is defined solely by the claims. The features illustrated or described in connection with one example embodiment may be combined with the features of other embodiments. Such modifications and variations are intended to be included within the scope of the present disclosure. In the present disclosure, like-named components of the embodiments generally have similar features and/or purposes, unless stated otherwise.

The present disclosure is generally related to systems and methods of clock synchronization, and represents improvements over conventional clock synchronization protocols. In some distributed computing systems, computing nodes may have their local internal clocks synchronized with a remote reference clock for keeping accurate time. Conventional clock sync protocols typically transmit data packets that encapsulate time information from a time server. These conventional clock sync data packets are typically processed according to one or more upper layer communication protocols (e.g., UDP/IP). Accordingly, conventional clock synchronization protocols typically incur significant processing overhead and bandwidth utilization that may limit their usefulness for certain types of applications, including but not limited to electronic trading systems.

Systems and methods for clock synchronization are disclosed herein that involve a primary node generating clock sync symbols from the output of a reference clock and inserting the clock sync symbols within a symbol-encoded transmission stream to one or more secondary nodes. As described in greater detail below, the clock sync symbols can be generated using reserved control codes that are defined in a symbol encoding scheme for data transmission. The clock sync symbols are relatively small in size as compared to packets that carry data for conventional clock synchronization protocols, and thus can have minimal impact on the bandwidth and latency of a data connection.

Upon receiving a symbol stream, a secondary node can extract the clock sync symbols from the stream to synchronize its local clock with the reference clock of the primary node. In some embodiments, the processing of the extracted clock sync symbols for clock synchronization is separate from normal processing of the rest of the symbol stream. Accordingly, the need to alter the normal processing of the symbol stream can be avoided.

Since the clock sync symbols can be removed and processed separately from the symbol stream, an additional benefit is that the clock sync symbols can be inserted into a symbol stream at any symbol location, e.g., even between consecutive symbols of a symbol encoded data frame. In some embodiments, the clock sync symbols can replace some of the control symbols in the symbol stream (e.g., idle or comma symbols). Accordingly, the clock sync symbols can be inserted into a symbol stream at fixed intervals, irregular intervals, or at any arbitrary time for high resolution clock synchronization.

As described below, example embodiments of high resolution clock synchronization can be useful for electronic trading systems or other distributed computing systems having a mesh architecture. However, persons skilled in the art will recognize that the disclosures provided herein can be adapted and/or modified for use in many different environments. For example, in some embodiments, a network switch can act as a primary node that transmits special physical layer clock sync symbols to all systems or devices connected to it. The example embodiments of high resolution clock synchronization can also be useful in hub-and-spoke type network topologies in which the "hub" system transmits clock sync symbols to one or more "spoke" or end node systems for clock synchronization.

In some embodiments, a high speed electronic trading system can be adapted or modified to include high resolution clock synchronization using special physical layer clock sync symbols. The example high speed electronic trading systems described herein can provide a market where orders to buy and sell financial instruments (such as stocks, bonds, commodities, futures, options, and the like) are traded among market participants (such as traders and brokers). The electronic trading system exhibits low latency, fairness, fault tolerance, and other features more fully described below.

The electronic trading system is primarily responsible for "matching" orders to one another. In one example, an offer to "buy" an instrument is matched to a corresponding counteroffer to "sell". The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book". The retained information regarding unmatched orders can be used by the matching engine to satisfy subsequent orders. An order book is typically maintained for each instrument and generally defines or otherwise represents the state of the market for that particular product. It may include, for example, the recent prices and quantities at which market participants have expressed a willingness to buy or sell.

The results of matching may also be made visible to market participants via streaming data services referred to as market data feeds. A market data feed typically includes individual messages that carry the pricing for each traded instrument, and related information such as volume and other statistics.

FIG. 1 illustrates an example electronic trading system 100 that includes a number of gateways 120-1, 120-2, ..., 120-g (collectively referred to as gateways 120), a set of core compute nodes 140-1, 140-2, ..., 140-c (collectively, the core compute nodes 140 or compute nodes 140), and one or more sequencers 150-1, 150-2, ..., 150-s (collectively, the sequencers 150). In some embodiments, the gateways 120, core compute nodes 140, and sequencers 150 are thus considered to be nodes in electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the system 100 refers to another device that generally serves the same function (e.g., "gateway" vs. "core compute node" vs. "sequencer") in electronic trading system 100. For example, gateways 120-2, ..., 120-g are the peers for gateway 120-1, core compute nodes 140-2, ..., 140-c are the peers for core compute node 140-1, and sequencers 150-2, ..., 150-s are the peers for sequencer 150-1.

The electronic trading system 100 processes orders from and provides related information to one or more participant computing devices 130-1, 130-2, ..., 130-p (collectively, the participant devices 130). Participant devices 130 interact with the system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on some physical or virtual data processing platform.

Each participant device 130 may exchange messages with (that is, send messages to and receive messages from) the electronic trading system 100 via connections established with a gateway 120. While FIG. 1 illustrates each participant device 130 as being connected to electronic trading system 100 via a single connection to a gateway 120, it should be understood that a participant device 130 may be connected to electronic trading system 100 over multiple connections to one or more gateway devices 120.

Note that, while each gateway 120-1 may serve a single participant device 130, it typically serves multiple participant devices 130.

The compute nodes 140-1, 140-2, . . . , 140-c (also referred to herein as matching engines 140 or compute engines 140) provide the matching functions described above and may also generate outgoing messages to be delivered to one or more participant devices 130. Each compute node 140 is a high-performance data processor and typically maintains one or more data structures to search and maintain one or more order books 145-1, 145-2 . . . , 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100) to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers ensures the correct ordering of operations is maintained throughout the distributed system 100, regardless of which compute node or set of compute nodes 140 processes the messages. This approach provides "state determinism," to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, sequencer 150 may not only send a sequenced version of the message (e.g., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails. For embodiments with multiple sequencers 150 (e.g., a currently active sequencer 150-1, and one or more standby sequencers 150-2, . . . , 150-s), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through electronic trading system 100 that may be delivered to regulatory authorities and/or clients, who may, for example be connected via participant devices 130. In alternate embodiments, the drop copy service 152 may be implemented on one or more gateways 120. Furthermore, in addition to or instead of referencing the system state log, the drop copy service 152 may provide the record of trading activity based on the contents of incoming and outgoing messages sent throughout electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, participant devices 130-1, 130-2, and 130-3 may simultaneously have established trading connections and may be exchanging messages with gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, gateways 120 may translate outgoing messages generated in the normalized format by electronic trading system 100 into messages in the format of one or more financial trading protocols used by participant devices 130 to communicate with gateways 120.

In the era of high-speed trading, in which microseconds or even nanoseconds are consequential, participants 130 exchanging messages with the electronic trading system 100 are often very sensitive to latency, preferring low, predictable latency. The arrangement shown in FIG. 1 accommodates this requirement by providing a point-to-point mesh 172 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, dedicated connection 180-1-1 is provided between gateway 1 120-1 and core compute node 1 140-1, dedicated connection 180-1-2 between gateway 1 120-1 and compute node 2 140-2, and so on, with example connection 180-g-c provided between gateway 120-g and compute node 140-c, and example connection 180-s-c provided between sequencer 150 and core c 140-c.

It should be understood that each dedicated connection 180 in the mesh 172 is, in some embodiments, a point-to-point direct connection that does not utilize a shared switch. A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the mesh 172 may be provided in a number of ways, such as a 10 Gigabit Ethernet (GigE), 25 GigE, 40 GigE, 100 GigE, InfiniBand, Peripheral Component Interconnect—Express (PCIe), RapidIO, Small Computer System Interface (SCSI), FireWire, Universal Serial Bus (USB), High Definition Multimedia Interface (HDMI), or custom serial or parallel busses.

Therefore, although the compute engines 140, gateways 120, sequencers 150 and other components may sometimes be referred to herein as "nodes", the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as the compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, . . . , 150-s. While not pictured in FIG. 1, in some embodiments, dedicated connections 180 may also be provided among all the gateways 120, so that each gateway 120-1 has a dedicated connection 180 to each other gateway 120-2, . . . , 120-g. Similarly, in some embodiments, dedicated connections 180 are also provided among all the compute nodes 140, so that an example core compute node 140-1 has a dedicated connection 180 to each other core compute node 140-2, . . . , 140-c.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between gateway 120-1 and core compute node 140-1 (e.g., Core 1) may actually be implemented as a pair of dedicated connections.

In addition, according to some embodiments, any message sent out by a node is sent out in parallel to all nodes directly connected to it in the point-to-point mesh 172. Each node in the mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from participant device 130-1, such as a trader's personal computer, and arrive at gateway 120-1 (i.e., GW 1). That message will be sent to all core compute nodes 140-1, 140-2, . . . , 140-c even though only core compute node 140-2 is currently performing matching for Microsoft orders. All other core compute nodes 140-1, 140-3, . . . , 140-c may upon receipt ignore the message or only take minimal action on the message. For example, the only action taken by 140-1, 140-3, . . . , 140-c may be to consume the sequence number assigned to the message by the sequencer 150-1. That message will also be sent to all of the sequencers 150-1, 150-2, . . . , 150-s even though a single sequencer (in this example, sequencer 150-1) is the currently active sequencer servicing the mesh. The other sequencers 150-2, . . . , 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of electronic trading system 100 at another physical location, the replica comprising physical or virtual instantiations of some or all of the individual components of electronic trading system 100.

By sending each message out in parallel to all directly connected nodes, the system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00", in some embodiments, multiple core compute nodes 140 may simultaneously perform matching for Microsoft orders. For example, both core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated by and sent from the core compute nodes 140-1 and 140-2 are substantially equivalent; accordingly, the architecture of electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may therefore also improve the overall latency of the system.

Such a point-to-point mesh 172 architecture of system 100, besides supporting low, predictable latency and redundant processing of messages, also provides for built-in redundant, multiple paths. As can be seen, there exist multiple paths between any gateway 120 and any compute node 140. Even if a direct connection 180-1-1 between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time. Because the topology of the point-to-point mesh does not favor any single gateway 120, chances are minimized that being connected to a particular gateway 120 may give a participant device 130 an unfair advantage or disadvantage.

Additionally, the point-to-point mesh architecture of system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the mesh 172, but the internal wiring of the mesh may remain intact.

Accordingly, in some embodiments, the reconfiguration of the function of a node may be accomplished live, even dynamically, during trading hours. For example, due to changes on characteristics of the load of electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications, in contrast to messages related to trading activity carried over the dedicated connections 180 in the mesh 172. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments such as electronic trading system 100 sometimes rely on high resolution clocks to maintain tight synchronization among various components. To that end, one or more of the nodes 120, 140, 150 might be provided with access to a clock, such as a high-resolution GPS clock 195 in some embodiments.

Figure 2:
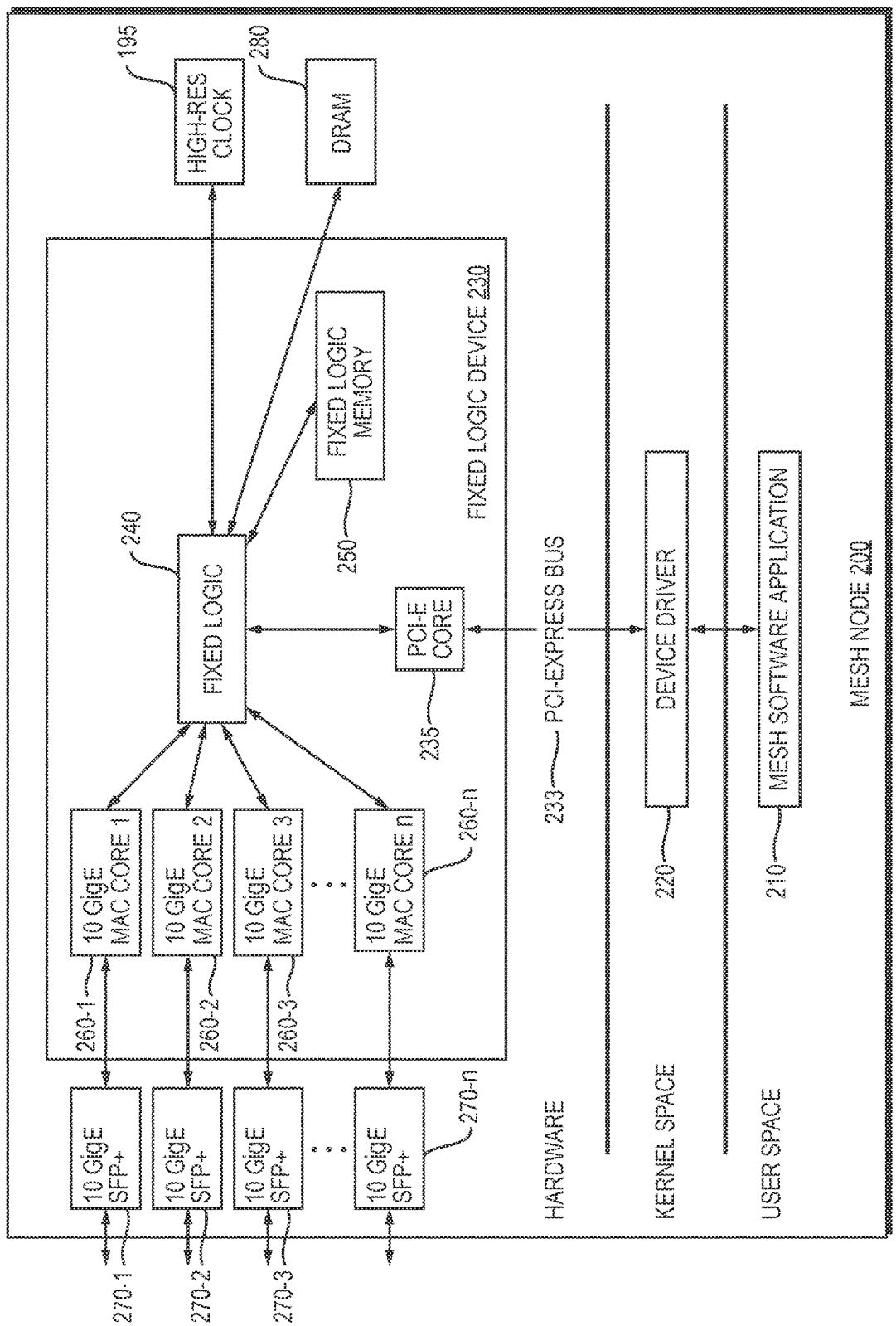
FIG. 2 is a schematic diagram that illustrates an example embodiment of a mesh node in the example electronic trading system of FIG. 1.

For purposes of the following discussion, gateways 120, compute nodes 140, and sequencers 150 connected in the mesh 172 may be referred to as "Mesh Nodes". FIG. 2 illustrates an example embodiment of a Mesh Node 200 in the point-to-point mesh 172 architecture of electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including USB, Peripheral Component Interconnect (PCI)-Express, High Definition Multimedia Interface (HDMI), 10 Gigabit Ethernet (GigE), 25 GigE, 40 GigE, 100 GigE, or InfiniBand (IB), over fiber or copper cables), in this example, Mesh Node 200 has multiple low latency 10 Gigabit Ethernet SFP+ connectors (interfaces) 270-1, 270-2, 270-3, . . . , 270-n, (known collectively as connectors 270). Connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE MAC Cores 260-1, 260-2, 260-3, ..., **260-*n*, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230**, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, Mesh Node 200 may also include other hardware components. For example, depending on its role in the electronic trading system 100, Mesh Node 200 in some embodiments may also include High-Resolution Clock 195 (also illustrated in and discussed in conjunction with FIG. 1) used in the implementation of high-resolution clock synchronization among nodes in electronic trading system 100. A Dynamic Random-Access Memory (DRAM) 280 may also be included in Mesh Node 200 as an additional memory in conjunction with Fixed Logic Memory 250. DRAM 280 may be any suitable volatile or non-volatile memory, including one or more random-access memory banks, hard disk(s), and solid-state disk(s), and accessed over any suitable memory or storage interface.

FIGS. 3A, 3B, 3C, and 3D illustrate a system and method of high resolution clock synchronization using special physical layer control symbols according to an embodiment. In the illustrated embodiment, the system 300 is a distributed computing system including a primary node 310 communicates with one or more secondary nodes 320-1, 320-2, ... **320-*n* (collectively, secondary nodes 320) by exchanging symbol-encoded data and control symbols (e.g., idle symbols) over one or more data connections. In some embodiments, the nodes 310 and 320 can be connected via dedicated connections 330-1, 330-2, ..., 330-*n* (collectively, data connections 330). In some embodiments, the data connections 330 can be provided by physical point-to-point communication links of fixed length, such that the transmit latency can be substantially fixed. In other embodiments, the communication between the primary node 310 and secondary nodes 320 may be over a shared communications medium, possibly via a switch. In the context of the electronic trading system 100 of FIG. 1, the primary nodes 310-1 and 310-2 can be any node in the electronic trading system 100 of FIG. 1, including any of the gateways 120, sequencers 150, or core compute devices 140. The secondary nodes 320 can include all other nodes in the system 100**.

The primary node 310 can be equipped with a reference clock 315, and the secondary nodes 320 can be equipped with internal local clocks 325-1, 325-2, ... **325-*n* (collectively, local clocks 325) that are synchronized to the reference clock 315. The reference clock 315 is preferably a high resolution clock, such as but not limited to an atomic GPS clock. The reference clock 315 can generate clock tick pulses for driving a reference time counter 317. The reference time counter 317, in turn, can be configured to increment at a clock tick rate for a desired time resolution (e.g., seconds, milliseconds, microseconds, or nanoseconds). For some distributed computing systems, such as the electronic trading system of FIG. 1, the desired time resolution of the reference clock 315 can be in the range of milliseconds to nanoseconds. Each of the local clocks 325 can be voltage controlled oscillators and/or other electronic oscillators that can drive a local time counter 327-1, 327-1, ..., 327-*n* (collectively local time counters 327) with a time resolution matching the resolution of the reference clock 315**.

Figure 3A:
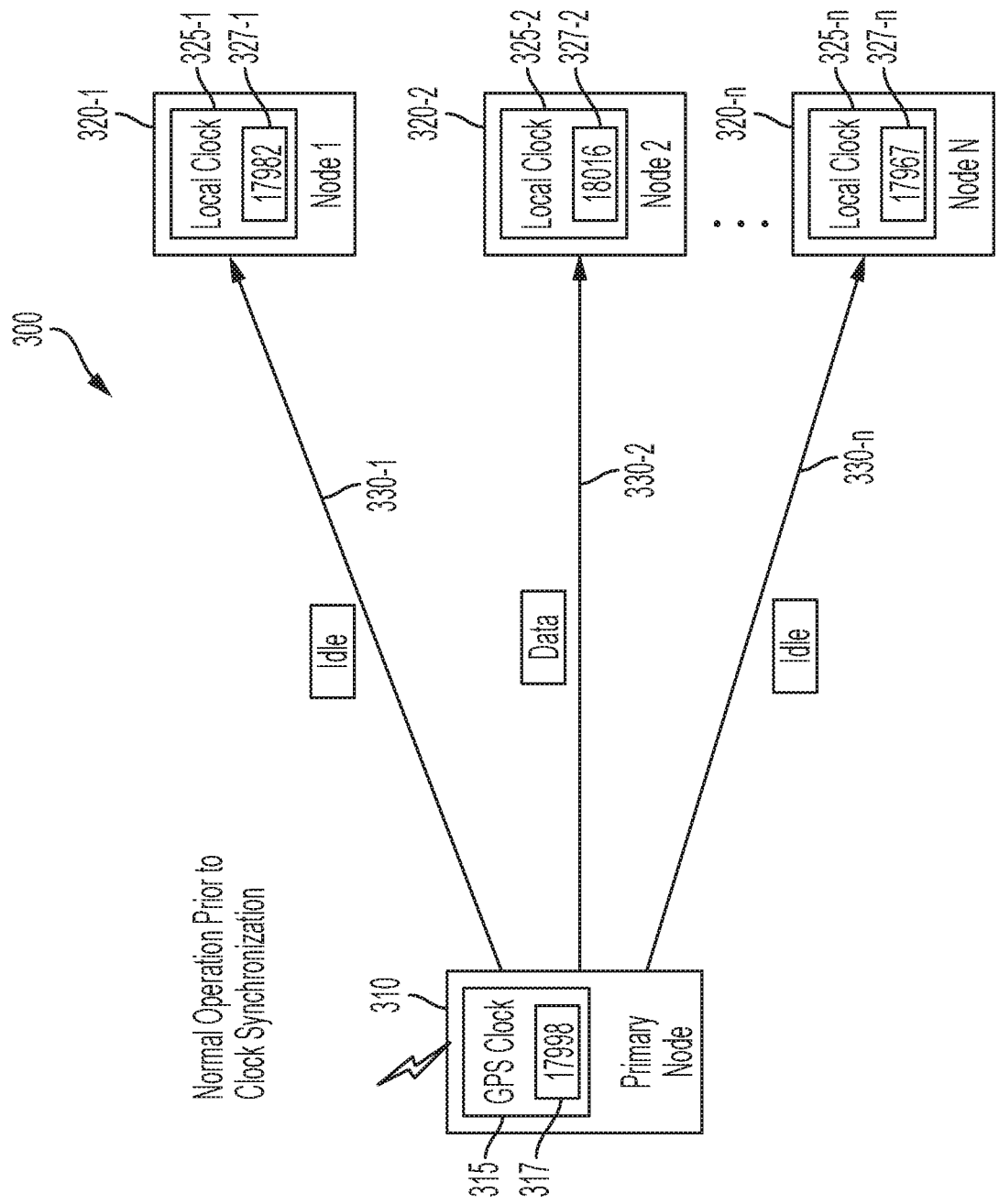
FIGS. 3A, 3B, 3C, and 3D illustrate a system and method of high-resolution clock synchronization using special physical layer control symbols according to an embodiment.

It is not uncommon for local clocks to drift over time such that the local time at a secondary node does not match the reference time at the primary node. For example, as shown in FIG. 3A, clock drift can cause a local time counter (e.g., 327-1 and **327-*n*) to lag the reference time counter 317. Conversely, clock drift can cause a local time counter (e.g., 327-2) to lead the reference time counter 317**. In the example embodiment of an electronic trading system, significant clock drift can be proactively corrected in order to avoid such timing differences from affecting the fair and equitable operation of the market using any of the high resolution clock synchronization methods disclosed herein.

Figure 3B:
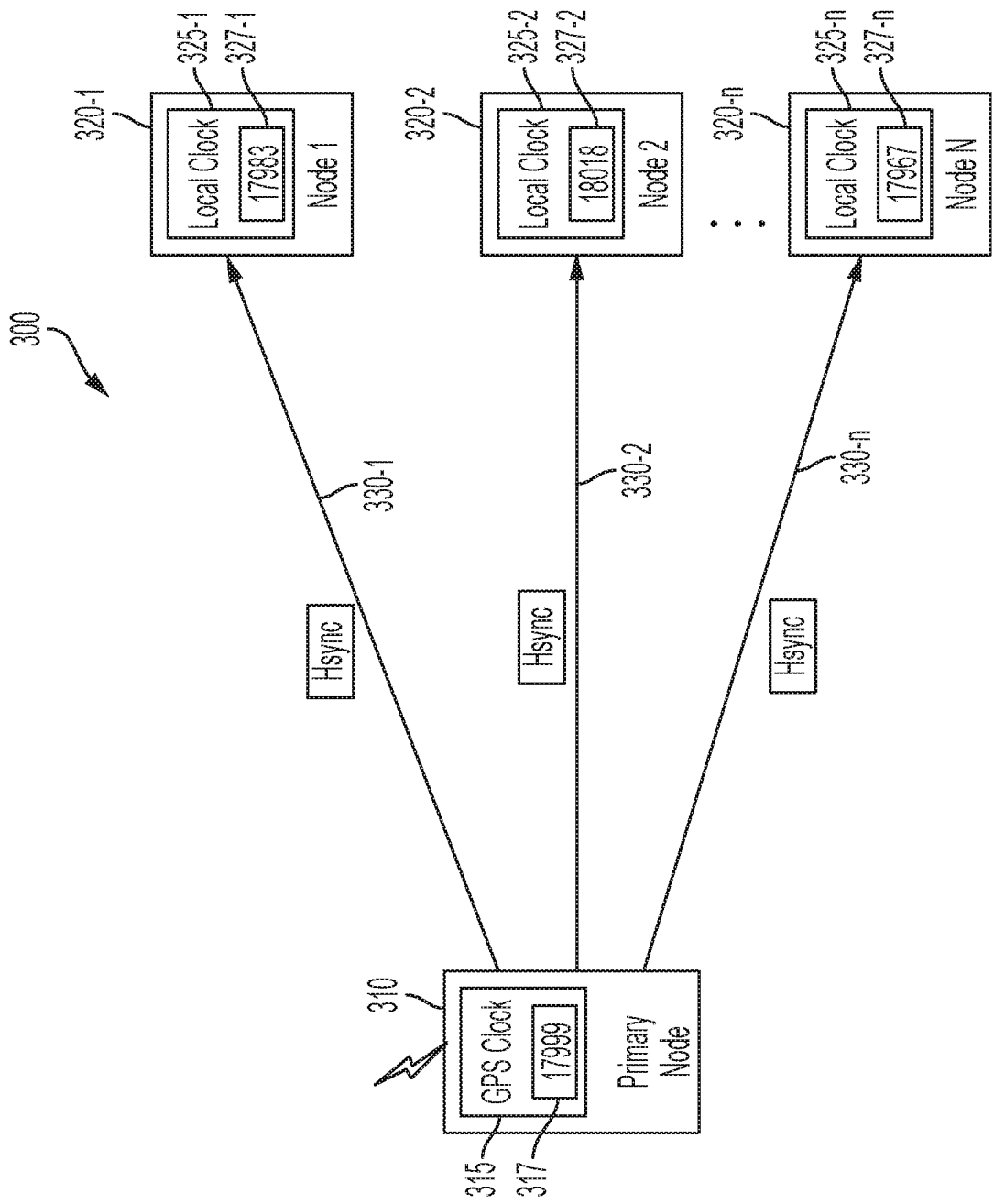

As illustrated in FIG. 3B, to synchronize the local clocks 325, the primary node 310 can generate and insert clock sync symbols Hsync into symbol-encoded transmission streams that can be sent across the data connections 330 to the respective secondary nodes 320. In some embodiments, the clock sync symbols can be transmitted over the data connections 330 at the same or at different intervals.

Figure 3C:
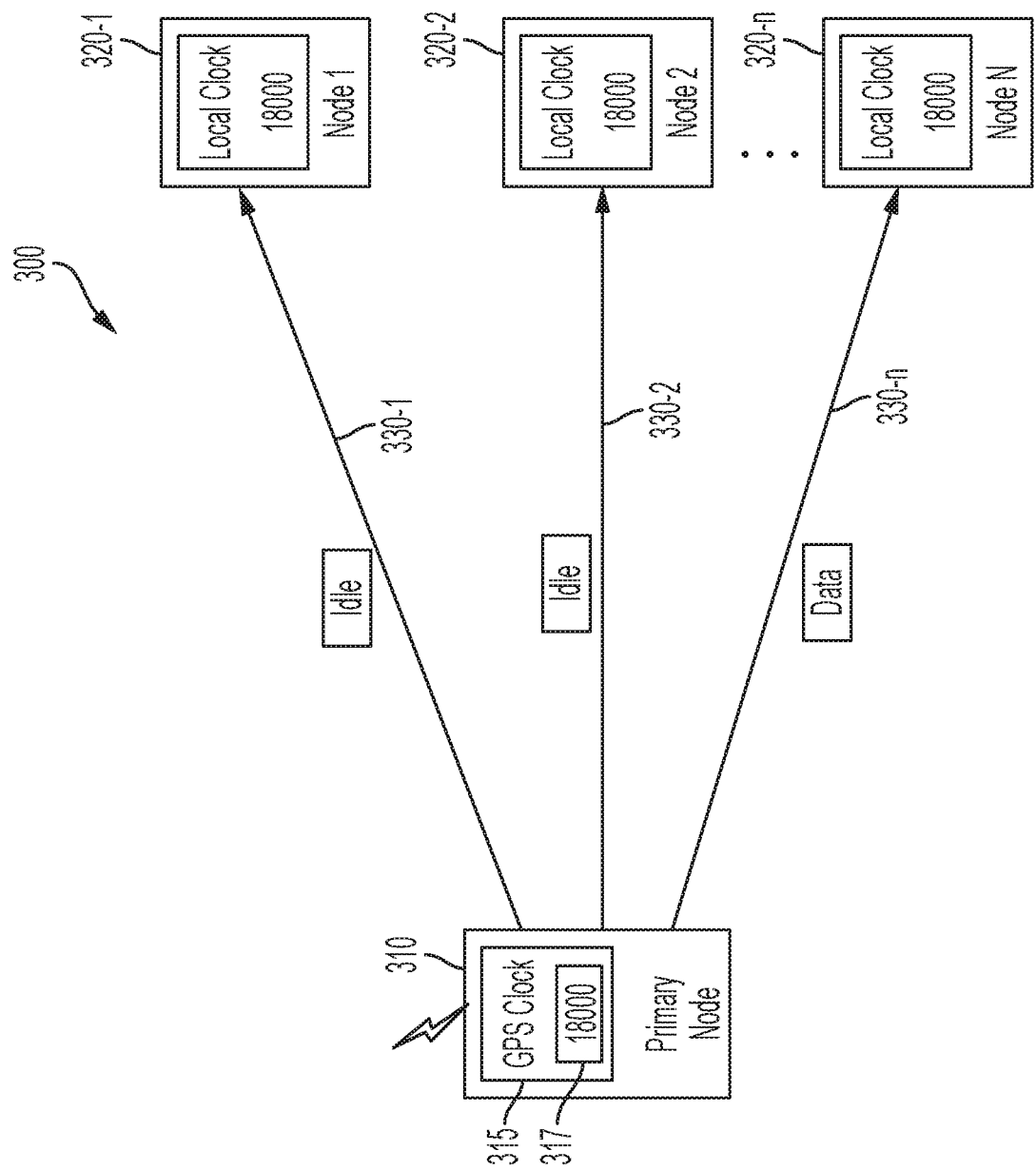

When a secondary node 320 detects a clock sync symbol Hsync within the symbol stream, the clock sync symbol Hsync can be extracted from the symbol stream and processed to synchronize the local clock 325 of the secondary node 320 to the reference clock 315. In some embodiments, the local clocks 325 and/or the local clock time counters 327 can be adjusted or modified such that the local timestamps are synchronized to the reference timestamp of the reference clock, e.g., as shown in FIG. 3C.

As described in more detail below, in some embodiments, the clock sync symbols Hsync can be used at the secondary node to generate a series of sync pulses. The sync pulses are input as a reference signal to a digital phase locked loop (PLL) for synchronizing the phase of the local clock pulses ("clock ticks") to the phase of the reference clock ticks of the reference clock 315 (e.g., FIG. 8A). Alternatively or additionally, in some embodiments, the clock sync symbols Hsync can include time information that is used at the secondary node for determining and compensating for time differences between the local clock time counter 327 and the reference clock time counter 317 (e.g., FIGS. 8B and 8C). In some embodiments, the time information can include a reference timestamp, a reference timestamp offset, and/or a delta between consecutive reference timestamps.

In some embodiments, the local time counters 327 can be synchronized to have a clock tick accuracy with respect to the reference time counter 317 in an approximate range of about zero (0) to about ten (10) clock ticks, and preferably in a range of about zero (0) to about two (2) clock ticks.

Figure 3D:
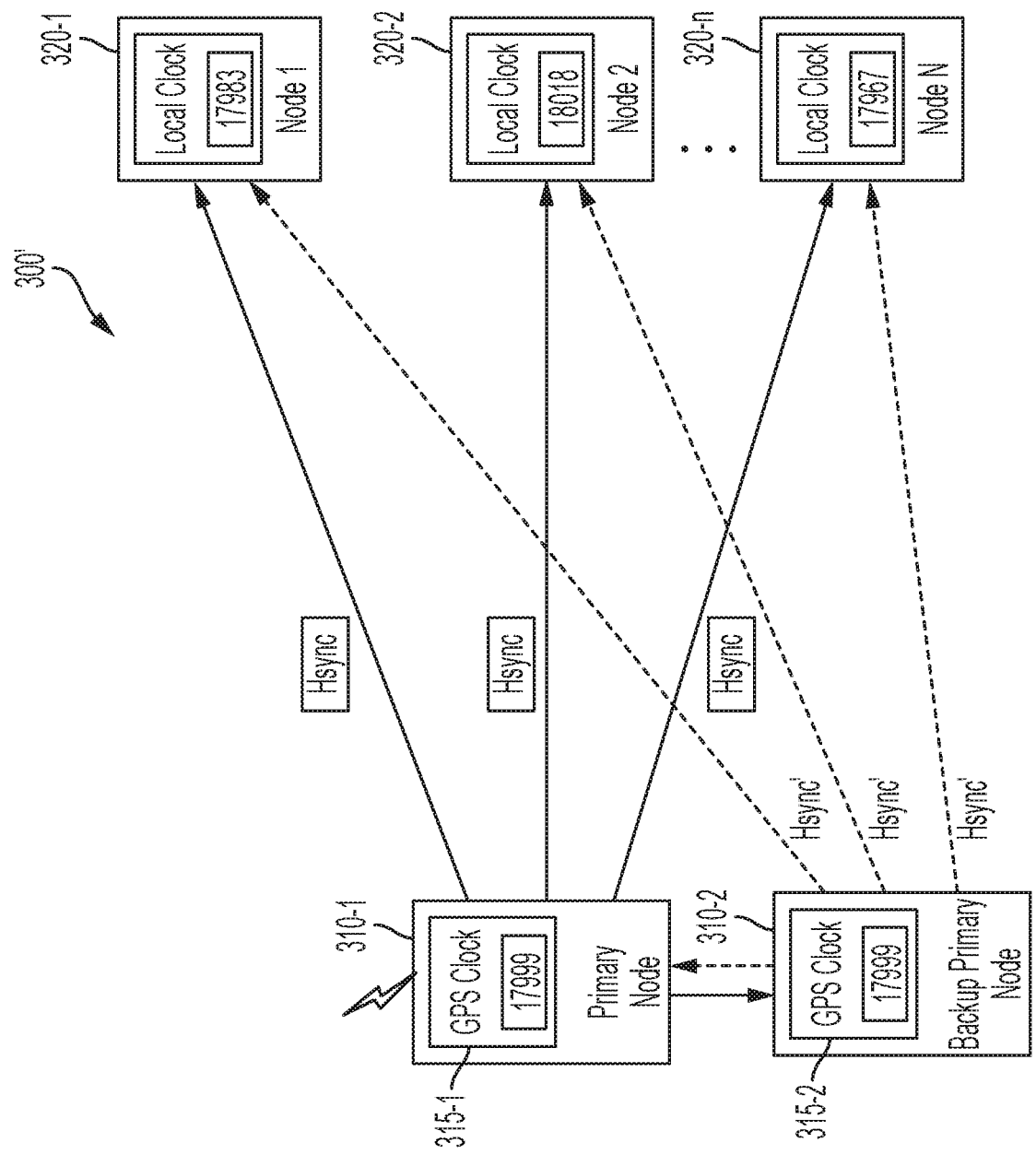

Referring to FIG. 3D, in some embodiments, more than one primary node can be provided for purposes of redundancy and/or high availability. For example, as shown in the illustrated embodiment, the distributed computing node 300' can include multiple primary nodes 310-1 and 310-2, each node being equipped with a reference clock 315-1 and 315-2 for synchronizing the local clocks 325.

In some embodiments, one of the primary nodes (e.g., 310-2) can serve as a backup to an active primary node (e.g., 310-1). For example, the backup primary node 310-2 can be configured to start sending clock sync symbols Hsync' in response to detecting that the active primary node 310-1 has stopped sending clock sync symbols Hsync. In some embodiments, the primary nodes 310-1 and 310-2 can be active at the same time for transmitting clock sync symbols Hsync and Hsync' to the secondary nodes 320. In the event that the time information provided by the clock sync symbols Hsync and Hsync' do not match, the secondary nodes 320 can be configured to use a clock sync symbol selected from one of the primary nodes according to an order of precedence. For example, in some embodiments, each of the primary nodes can be assigned a respective priority score that can be used to define the order. Although the distributed computing system 300' of FIG. 3D shows only two primary nodes for clock synchronization, any number of primary nodes can be established for redundancy and high availability.

In some embodiments, the clock sync symbols Hsync and Hsync' can be generated according to a symbol encoding scheme for encoding a data transmission stream. For example, the clock sync symbols Hsync and Hsync' can include a reserved control code defined in the symbol encoding scheme to identify the clock sync symbol within a symbol stream. In some embodiments, the clock sync symbols Hsync and Hsync' can include encoded time information. The time information can include a reference timestamp, a reference timestamp offset, and/or a delta between consecutive reference timestamps for use in synchronizing the local time counters 327 with the reference time counter 317. Additionally or alternatively, the time information can include a transmit latency between the primary node 310 and a secondary node 320. In some embodiments, the clock sync symbols Hsync and Hsync' can omit explicit time information.

Figure 4A:
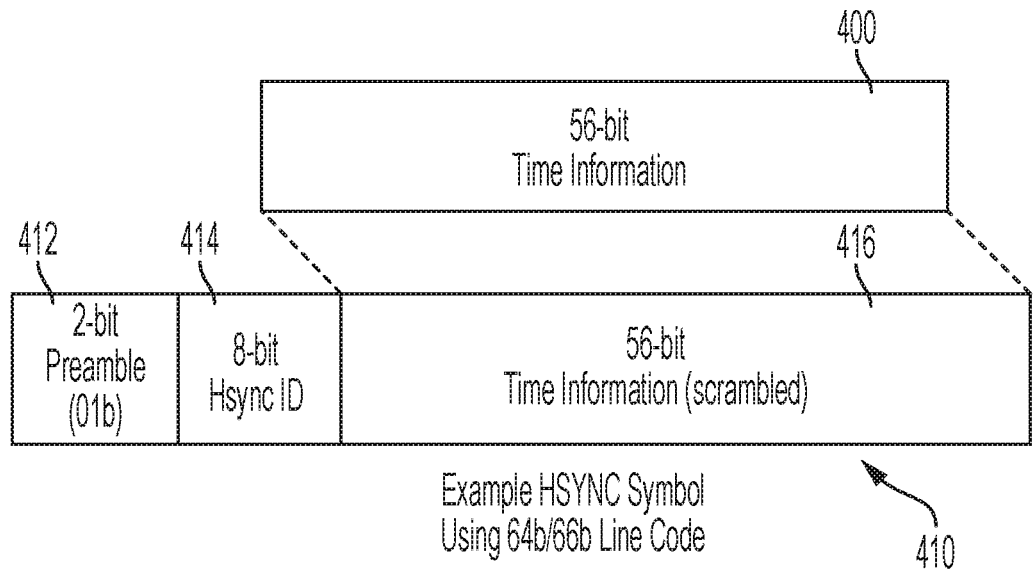
FIGS. 4A and 4B illustrate example formats for encoding clock sync symbols according to some embodiments.
Figure 4B:
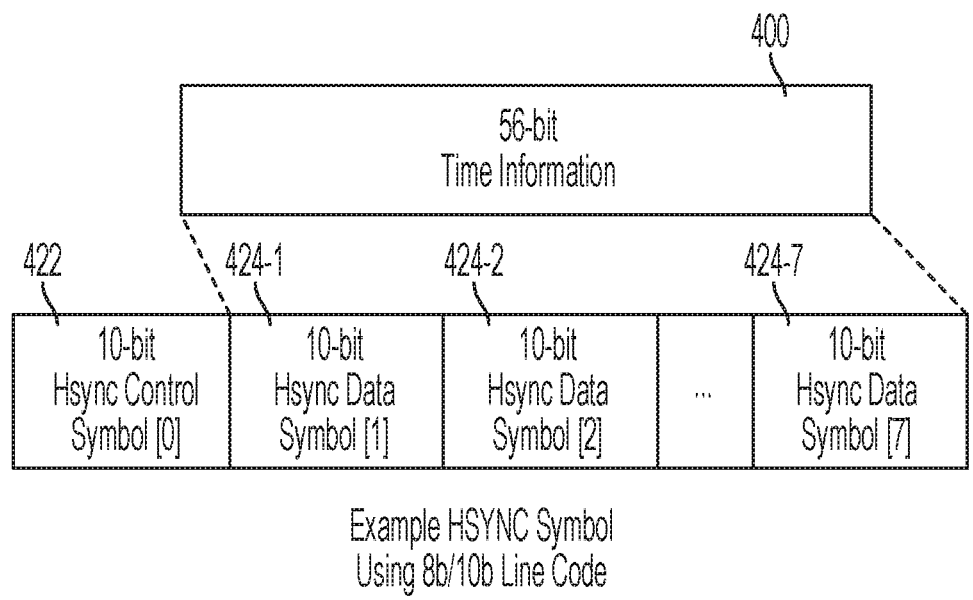

FIGS. 4A and 4B illustrate example formats for encoding clock sync symbols according to some embodiments. In particular, FIG. 4A illustrates an example format for an encoded clock sync symbol 410 using a 64 bit/66 bit line code. FIG. 4B illustrates an example format for an encoded clock sync symbol 420 using an 8 bit/10 bit line code. Persons skilled in the art will recognize that the disclosures provided herein can be adapted and/or modified to encode clock sync symbols using other symbol encoding schemes, such as without limitation 128/130 bit encoding schemes for PCI Express 3.0, 128/132 bit encoding for USB 3.1, and 64/67 bit encoding for Interlaken Protocol Specification.

As shown in FIG. 4A, time information 400 can be encoded in a clock sync symbol 410 according to a 64/66 bit encoding scheme. With 64/66 bit encoding, the clock sync symbol 410 can include a 2-bit preamble 412 (i.e., 01b), an 8-bit type field 414, and a 56-bit data field 416. The type field 414 can be an 8-bit reserved control code defined in the 64/66 bit encoding scheme for special, non-standard purposes. In the example embodiment, the reserved control code can be used for identifying a clock sync symbol 410 within a symbol stream. The time information 400 can be encoded in the 56-bit data field 416 in a scrambled format. In some embodiments, time information having a size greater than 56 bits can be transmitted over two or more 64/66 bit encoded clock sync symbols. The clock sync symbols 410 can be transmitted over data connections (e.g., 330 of FIG. 3A) that support 64/66 bit symbol encoding, including without limitation 10 Gigabit Ethernet, 25 Gigabit Ethernet, 100 Gigabit Ethernet, and InfiniBand.

As shown in FIG. 4B, the time information 400 can be encoded in a clock sync symbol 420 according to a 8/10 bit encoding scheme. With 8/10 bit encoding, the clock sync symbol 420 can include a 10-bit clock sync control symbol 422 and multiple 10-bit clock sync data symbols 424-1, 424-2, ..., 424-7 (collectively, the clock sync data symbols 424). The clock sync control symbol 422 can be a 10-bit reserved control code defined in the 8/10 bit encoded scheme for special, non-standard purposes. In the example embodiment, the reserved control code can be used for identifying a clock sync symbol 420 within a symbol stream. The clock sync data symbols 424 that follow the clock sync control symbol 422 can encode the time information 400. For example, seven clock sync data symbol 424 can be used to encoded 56-bits of time information. Persons skilled in the art will recognize that more or less than seven clock sync data symbols 424 can be generated depending on the size of the time information 400. The clock sync symbols 420 can be transmitted over data connections (e.g., 330 of FIG. 3A) that support 8/10 bit symbol encoding, including without limitation Gigabit Ethernet, PCI Express, and USB.

Figure 5A:
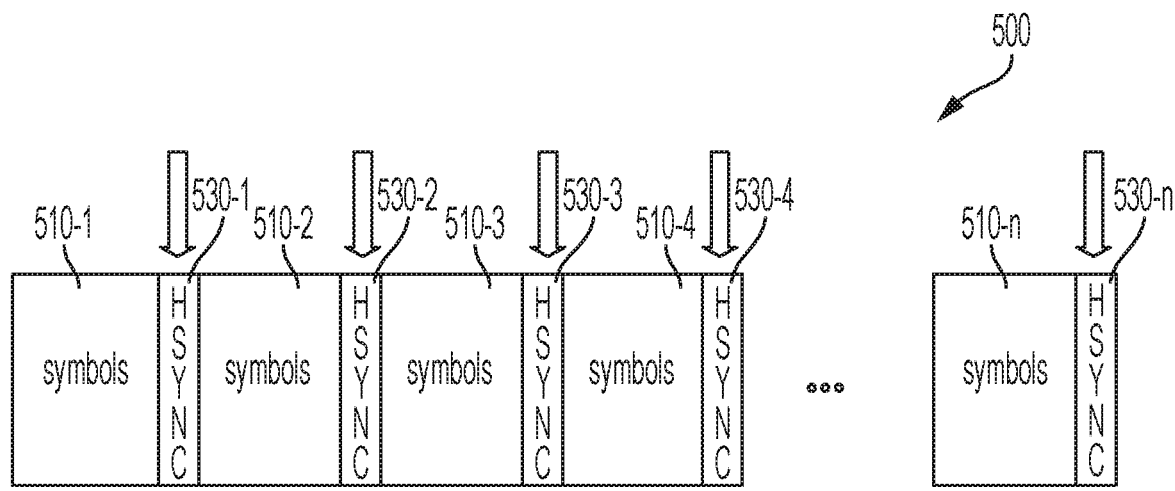
FIGS. 5A and 5B illustrate an example pattern of clock sync symbols (HSYNC) inserted in a symbol stream 500.
Figure 5B:
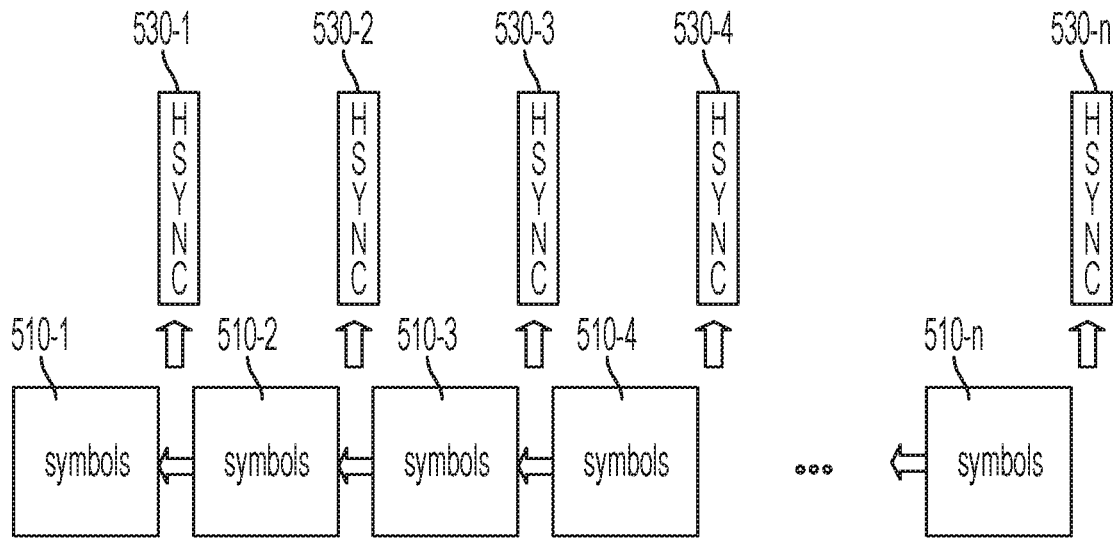

FIGS. 5A and 5B illustrate an example pattern of clock sync symbols (HSYNC) inserted in a symbol stream 500. Some symbols within the symbol stream 500 can carry data. For example, a frame, such as an Ethernet frame, can be encoded in a series of data symbols. Other symbols can carry control information (e.g., idle symbols, comma symbols, and/or other control symbols).

As shown in FIG. 5A, the clock sync symbols (HYSNC) 530-1, 530-2, 530-3, 530-4, and 530-$n$ (collectively 530) can be inserted periodically or quasi-periodically between consecutive series of symbols 510-1, 510-2, 510-3, 510-4 and 510-$n$ (collectively 510). In some embodiments, the clock sync symbols can be inserted at fixed intervals, irregular intervals, or at any arbitrary symbol location (e.g., Hsync symbols can be sent even when there is no application layer data to be transmitted and the data connection is idle).

As shown in FIG. 5B, the clock sync symbols (HSYNC) 530 can be detected, extracted, and decoded from the symbol stream 500 for use in a clock synchronization process. In some embodiments, the clock sync symbols (HSYNC) 530 can be extracted from the symbol stream 500 prior to processing the other data/control symbols 510 within the symbol stream 500. Accordingly, the need to alter the normal processing of the stream of data/control symbols 510 can be avoided.

Another benefit of extracting the clock sync symbols (HSYNC) 530 prior to normal processing of the other data/control symbols 510 can include the ability to insert the clock sync symbols 530 at any symbol location within the symbol stream 500, e.g., even between consecutive data symbols of a symbol-encoded frame. Put another way, in some embodiments, the clock sync symbols (HSYNC) are not required to be inserted in any predetermined pattern (e.g., at a predetermined position or time slot within a symbol stream, such as in a header portion of a data frame, or as the first or last symbol in a data frame). As described in more detail below, a clock sync symbol can be placed between any two consecutive symbols, or can replace one or more control symbols (e.g., idle or comma symbols). Accordingly, a primary node (e.g., 310) can insert clock sync symbols into a symbol stream at fixed intervals with a frame or across frames, or at irregular intervals, or at any arbitrary symbol location.

Figure 6A:
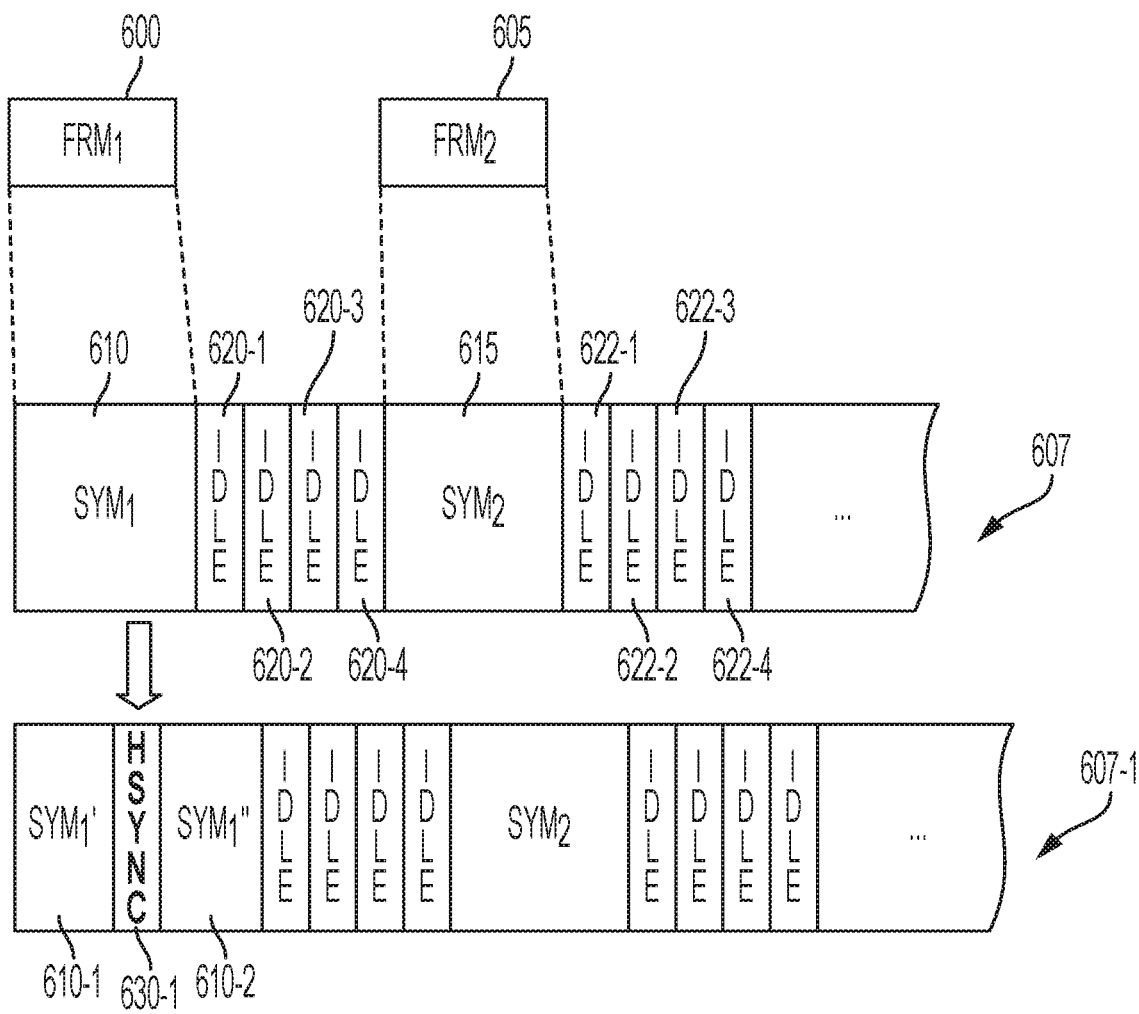
FIGS. 6A, 6B, 6C, and 6D illustrate a clock sync symbol (HSYNC) being inserted at example symbol locations within a symbol stream.
Figure 6B:
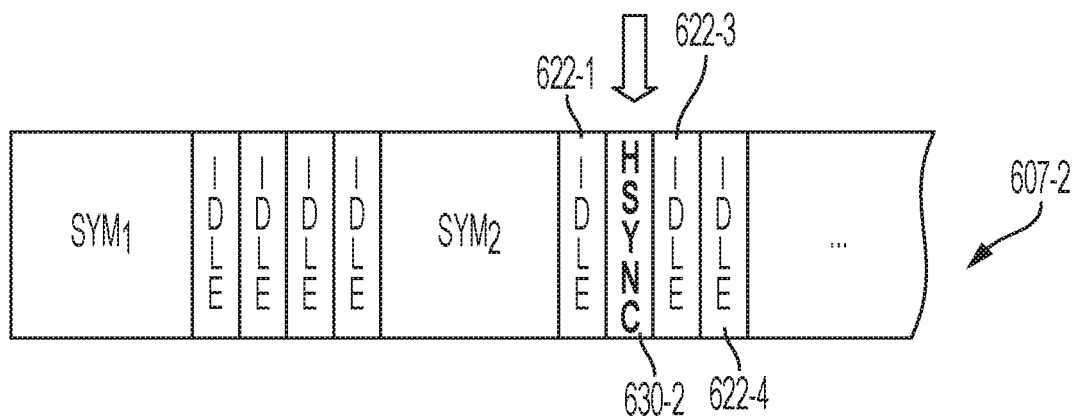
Figure 6C:
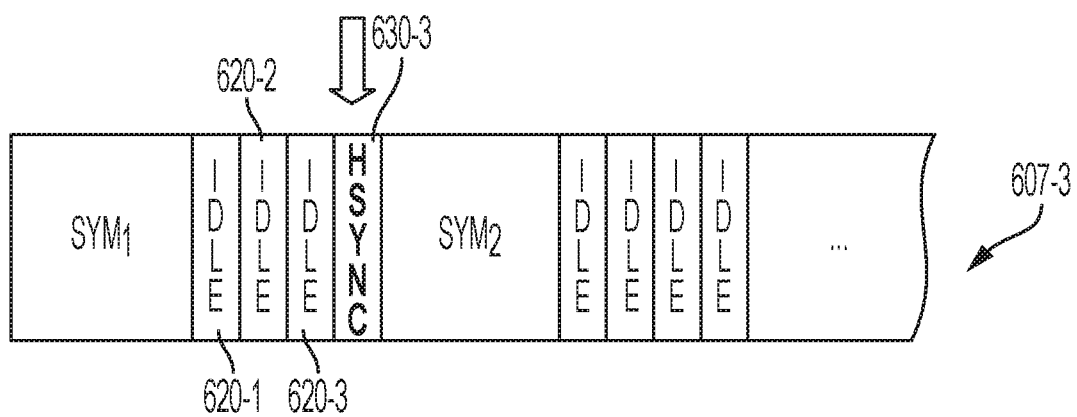

FIGS. 6A, 6B, and 6C illustrate a clock sync symbol (HSYNC) being inserted at example symbol locations within a symbol stream. Referring to FIG. 6A, each of the example data frames (FRM$_1$) 600 and (FRM$_2$) 605 is encoded into a series of multiple symbols. For example, as shown, example data frame (FRM$_1$) 600 is encoded into a symbol encoded frame consisting of a series of multiple symbols (SYM$_1$) 610. Example data frame (FRM$_1$) 600 is encoded into another symbol encoded frame consisting of a series of multiple symbols (SYM$_2$) 615. In some embodiments, the frames 600 and 605 can be encoded into symbols according to a symbol encoding scheme specified by a physical layer protocol specification (e.g., Physical Coding Sublayer (PCS) for 10 GigE, 25 GigE, 40 GigE, 100 GigE, etc.). It is also possible that idle symbols and other control symbols (e.g., comma symbols) may be inserted within the symbol stream. In the illustrated embodiment, the example symbol stream 607 includes idle symbols 620-1, 620-2, 620-3, and 620-4 located between the symbol-encoded frames 610 and 615 and further idle symbols 622-1, 622-2, 622-3, and 622-4 located after the symbol-encoded frame 615. Idle symbols are generally transmitted when there is no application layer data to be transmitted and the data connection is idle.

As indicated above, a clock sync symbol can be inserted at any two consecutive symbols within a symbol stream. For example, FIG. 6A illustrates an example symbol stream 607-1 in which a clock sync symbol 630-1 is inserted in the middle of a symbol-encoded frame 610. In particular, the clock sync symbol 630-1 can be inserted between any two consecutive symbols of the symbol-encoded frame 610. Put another way, the clock sync symbol 630-1 can be inserted into a symbol encoded frame 610 such that the clock sync symbol splits the encoded frame into a first symbol portion (SYM$_1$') 610-1 and a second symbol portion (SYM$_1$") 610-2. In some embodiments, there is no need to recalculate a cyclic redundancy check (CRC) or other error detecting code included in the encoded frame after insertion of the clock sync symbol 630-1, because the clock sync symbol can be extracted prior to normal processing of the encoded frame.

In some embodiments, a clock sync symbol can be inserted into a symbol stream such that the clock sync symbol replaces an idle symbol, a comma symbol or other control symbol. For example, FIG. 6B illustrates an example symbol stream 607-2 in which a clock sync symbol 630-2 is inserted at a symbol location instead of the idle symbol 622-2 (shown in FIG. 6A). In some embodiments, when a clock sync symbol is ready for transmission, transmission of a control symbol can be aborted or suppressed to allow transmission of the clock sync symbol in a timely manner.

Figure 6D:
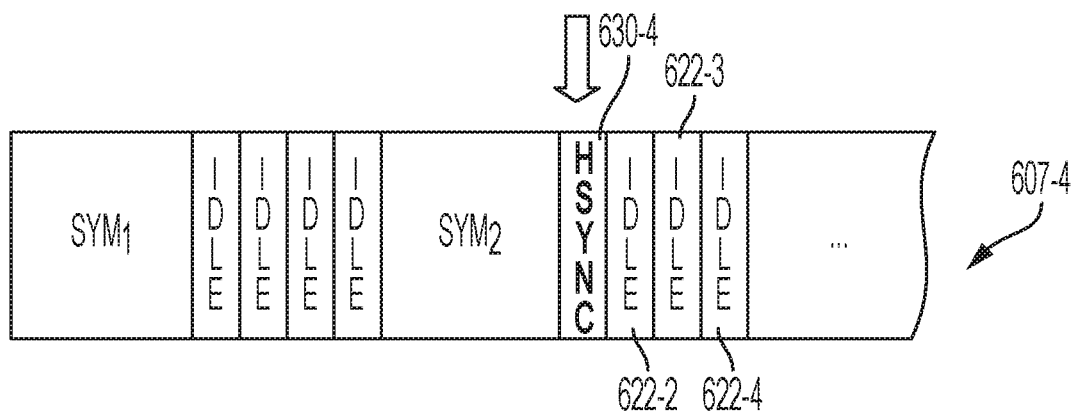

In some embodiments, a clock sync symbol can be inserted at the start or end of a symbol encoded frame. For example, FIG. 6C illustrates an example symbol stream 607-3 in which a clock sync symbol 630-3 is inserted at a symbol location adjacent to the start of the symbol-encoded frame (SYM$_2$) 615. FIG. 6D illustrates an example symbol stream 607-3 in which a clock sync symbol 630-4 is inserted at a symbol location adjacent to the end of the symbol-encoded frame (SYM$_2$) 615. As discussed above, in some embodiments, transmission of a control symbol can be aborted or suppressed to allow transmission of a clock sync symbol (e.g., 630-3 or 630-4).

Figure 7A:
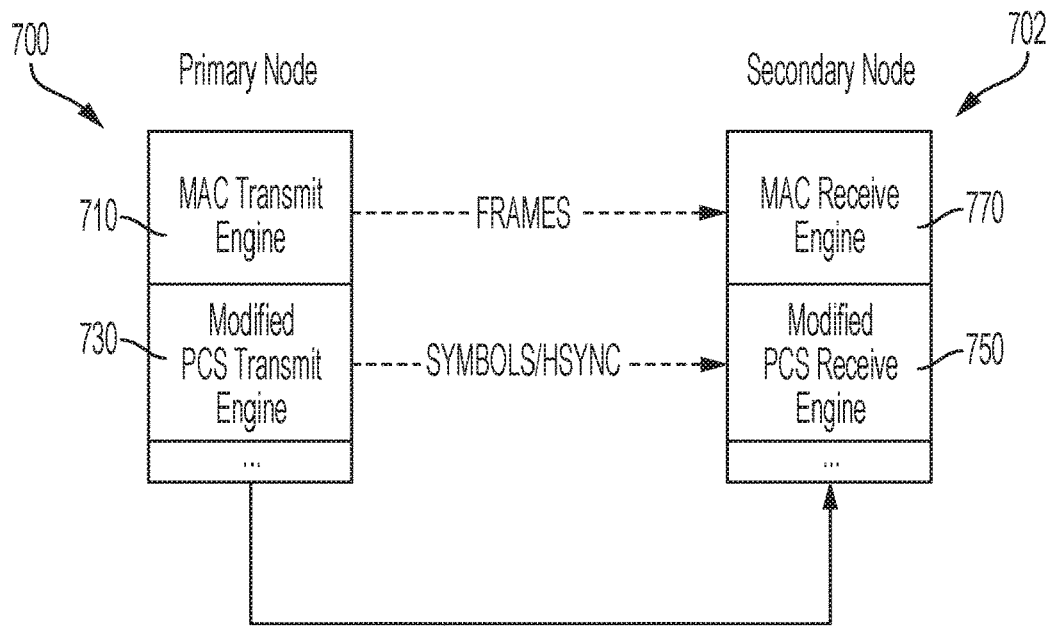
FIGS. 7A, 7B, and 7C are schematic diagrams that conceptually illustrate example components of a primary node and a secondary node for clock synchronization over a data connection according to an embodiment.
Figure 7B:
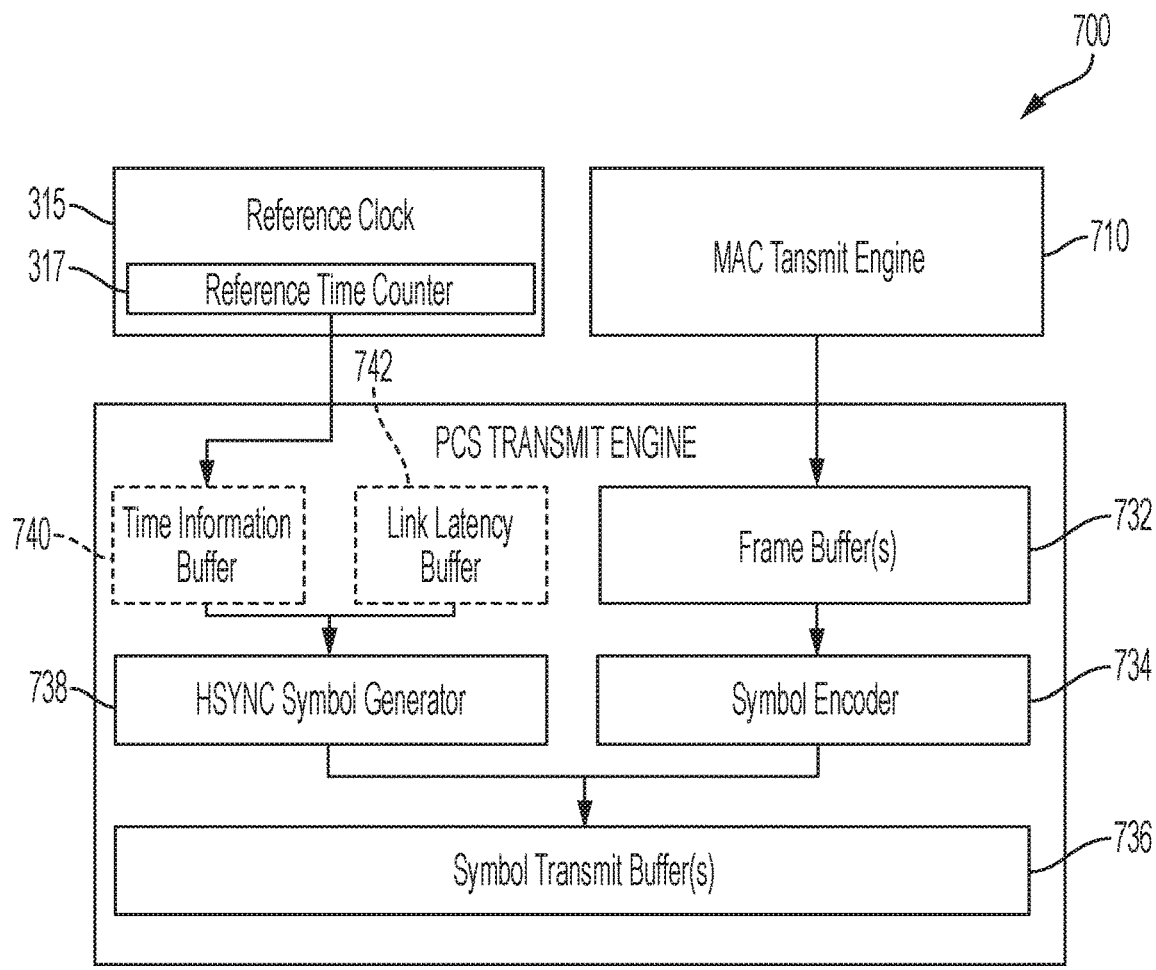
Figure 7C:
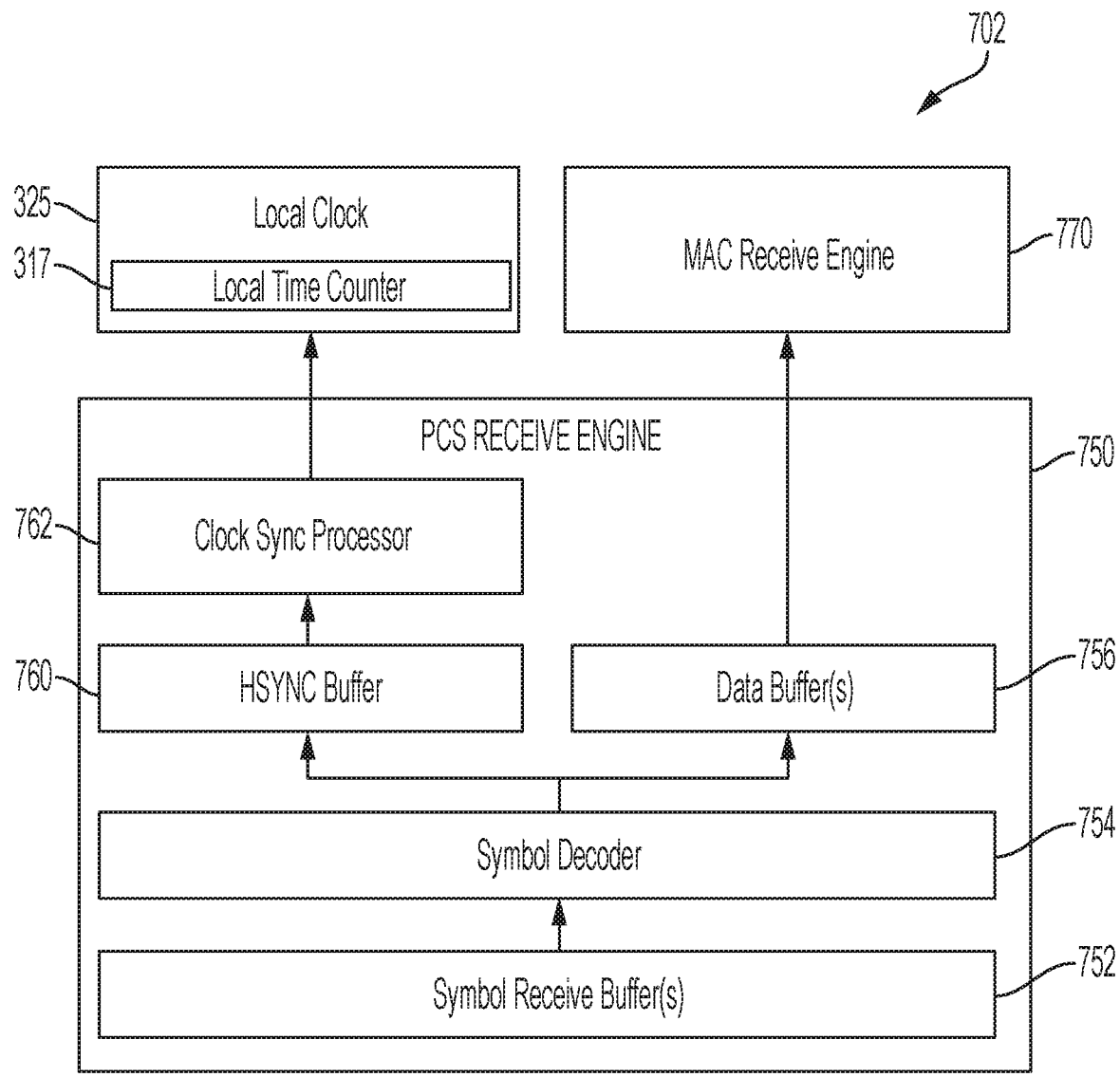

FIGS. 7A, 7B, and 7C are schematic diagrams that conceptually illustrate example components of a primary node and a secondary node for clock synchronization over a data connection according to an embodiment. Although the components described in the illustrated embodiment can be used for high resolution clock synchronization over certain Ethernet type communications (e.g., 10/25/40/100 GigE), a person skilled in the art will understand how the disclosures provided for herein can be adapted for use with other types of communications without departing from the spirit of the present disclosure (e.g., InfiniBand, PCI-Express, USB, HDMI, among others).

FIG. 7A is a schematic diagram that illustrates a transmit engine 700 of a primary node (e.g., 310 of FIG. 3A) and a receive engine 702 of a secondary node (e.g., 320 of FIG. 3A) that are capable of communication over certain Ethernet type communications (e.g., 10/25/40/100 GigE). The transmit engine 700 can include, among other components, a Media Access Control (MAC) transmit engine 710 and a Physical Coding Sublayer (PCS) transmit engine 730. The receive engine 702 can include, among other components, a Physical Coding Sublayer (PCS) receive engine 750 and a Media Access Control (MAC) receive engine 770. In particular, the PCS transmit engine 730 and the PCS receive engine 750 are modified or adapted to implement clock synchronization using special physical layer clock sync symbols that are inserted into a symbol-encoded data transmission stream. Except as described herein, the MAC and PCS protocol specifications, as well as the protocol specifications for other components typically used for Ethernet type communications, are generally well known and readily understood by persons skilled in the art. Accordingly, for the purpose of brevity, a detailed discussion of these components is omitted.

FIG. 7B is a detailed schematic diagram that illustrates the primary node transmit engine 700, including various example components of the modified PCS transmit engine 730 of FIG. 7A, according to an embodiment. As shown, the transmit engine 700 includes a reference clock 315 including a reference time counter 317, a MAC transmit engine 710, and a modified PCS transmit engine 730. In some embodiments, the modified PCS transmit engine 730 can include one or more frame buffers 732, a symbol encoder 734, one or more symbol transmit buffers 736, a clock sync symbol generator 738, a time information buffer 740, and a link latency buffer 742. In some embodiments, the reference time counter 317 can be directly coupled to the clock sync symbol generator 738, thereby rendering the time information buffer 740 optional. In some embodiments, the link latency buffer 742 can be omitted (e.g., where link latency is measured or configured at the secondary nodes (e.g., 320).

In operation, the MAC transmit engine 710 can, among other operations, receive data payloads (e.g., IP packets) destined for one or more of the secondary nodes 320 and encapsulate the packets into data frames (e.g., 600 and 605 of FIG. 6A). In this example, the packets are encapsulated into frames according to the MAC data link layer protocol specifications for transmission over some Ethernet connections (e.g., 10/25/40/100 GigE).

The modified PCS transmit engine 730 can, among other operations, receive the data frames (e.g., 600 and 605) generated by the MAC transmit engine 710 in the one or more frame buffers 732. The symbol encoder 734 can encode each frame into a symbol stream (e.g., 607 of FIG. 6A). In this example, the frames can be encoded into symbols using a 64/66 bit line code or an 8/10 bit line code used in some Ethernet based communications (e.g., 10/25/ 40/100 GigE) for providing a bit pattern having approximately equal numbers of zero and one bits. Other data communication standards may employ different encoding schemes, e.g., 128/130 bit encoding or 128/132 bit encoding. The symbols are subsequently provided to the one or more symbol transmit buffers 736 to await transmission over the Ethernet connection. In parallel, the reference clock 315 continuously generates clock tick pulses at a fixed interval.

The reference clock 315, such as an atomic GPS clock, can output the clock tick pulses to drive the reference time counter 317. In particular, the reference time counter 317 can be configured to increment a reference timestamp at a specific clock tick rate for a desired time resolution (e.g., seconds, milliseconds, microseconds, or nanoseconds). Based on the output of the reference time counter 317, the clock sync symbol generator 730 can periodically generate and insert a clock sync symbol into the symbol stream stored in the symbol transmit buffer 736. As discussed above, a clock sync symbol can be inserted at any symbol location within a symbol stream. To generate the clock sync symbol, time information (e.g., 400 of FIG. 4A) can be pushed or pulled from the reference time counter 317 into the time information buffer 740. The clock sync symbol generator 738 can encodes the time information from the buffer 740 into a clock sync symbol. In some embodiments, the time information can be provided directly from the reference time counter 317 to the clock sync symbol generator 738.

In some embodiments, the time information can be encoded in a scrambled data field 416 of a 64/66 bit clock sync symbol (e.g., 410 of FIG. 4A) or in one or more 8/10 bit clock sync data symbols 424 that follow an 8/10 bit clock sync control symbol (e.g., 420 of FIG. 4B). As discussed below with respect to FIG. 11, the primary node 310 can optionally measure or otherwise calculate a transmit latency associated with each data connection (e.g., 330 of FIG. 3A). Accordingly, in some embodiments, a transmit latency for each data connection can be stored in an optional link latency buffer 742 for encoding as time information of a clock sync symbol. In some embodiments, the clock sync symbol can be generated without any explicit time information by the symbol.

The symbol stream, including the inserted clock sync symbol(s), can be transmitted over an Ethernet connection to a secondary node 320 where the clock sync symbols can be used to synchronize the local clock at that node. As discussed in more detail below, the clock sync symbols are preferably removed from the symbol stream before the rest of the symbol stream is decoded and processed. Accordingly, an advantage of such processing can be that the clock sync symbols can be inserted between any two consecutive symbols of a symbol encoded frame without the need to recalculate an error-detecting code of the encoded frame.

FIG. 7C is a detailed schematic diagram that illustrates the secondary node receive engine 702, including various example components of the modified PCS receive engine 650 of FIG. 7A, according to an embodiment. As shown, the receive engine 702 can include a local clock 325 having a local time counter 327, a modified PCS receive engine 750, and a MAC receive engine 770. In some embodiments, the modified PCS receive engine 750 can include one or more symbol receive buffers 752, a symbol decoder 754, one or more data buffers 756, a clock sync data buffer 760, and a local clock sync processor 762.

In operation, the PCS receive engine 750 can receive the symbol stream (e.g., 607-1, 607-2, 607-3, and/or 607-4) including one or more clock sync symbols (e.g., 630) sent from the primary node 310 over the Ethernet connection. The symbol stream can be temporarily stored in the one or more symbol receive buffers 752. When the symbol decoder 754 detects a clock sync symbol within the symbol stream, the decoder can remove the clock sync symbol from the symbol stream and redirect the decoded symbol to a clock sync data buffer 760.

As discussed above in connection with FIGS. 4A and 4B, a reserved control code can be used to identify the clock sync symbol in a symbol stream. By removing the clock sync symbols as they are detected for clock sync processing, the rest of the symbol stream can be processed normally. For example, the symbol decoder 754 can decode the data frames and the control symbols from the rest of the symbol stream and temporarily store the frames in the one or more data buffers 756 for further processing by PCS receive engine 750 and MAC receive engine 770.

Figure 8A:
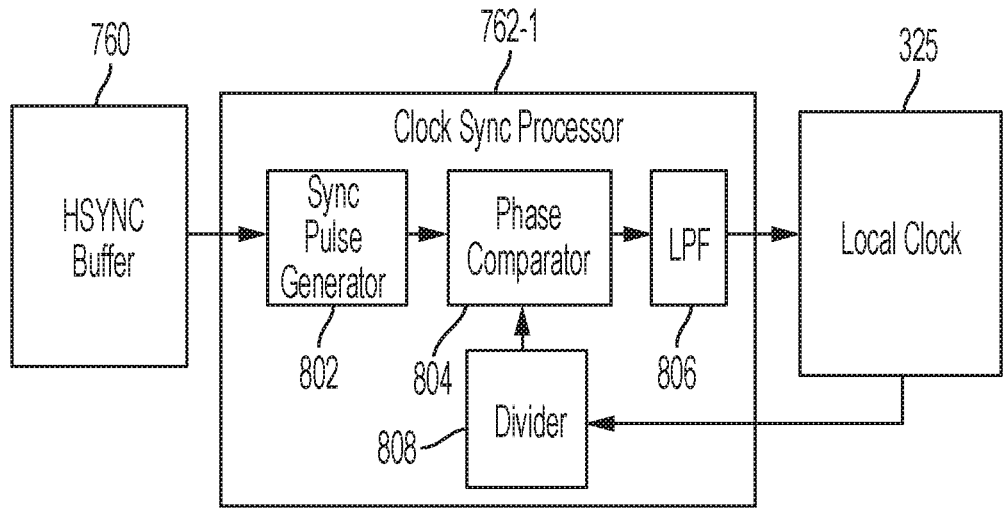
FIGS. 8A and 8B are schematic diagrams that illustrate a clock sync processor or other fixed logic that uses the clock sync symbols to synchronize a local clock according to an embodiment.
Figure 8B:
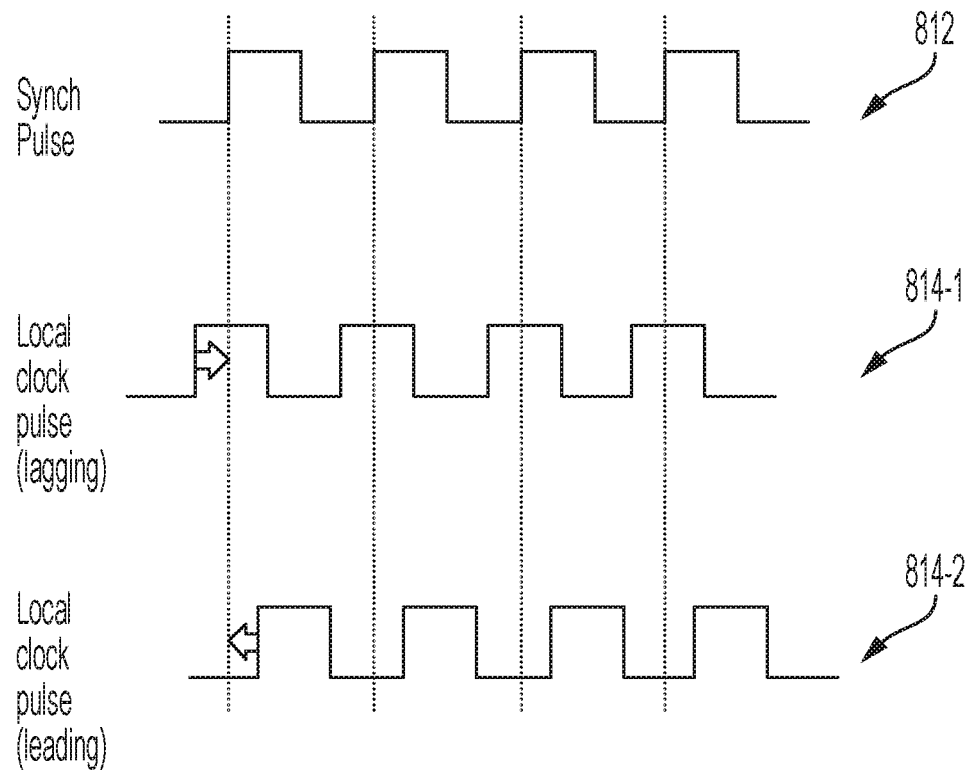

As discussed in greater detail below, the clock sync processor 762 or other fixed logic can adjust the local time counter 327 or the local clock 325 itself based on explicit or implicit time information provided by the clock sync symbol. For example, FIGS. 8A and 8B illustrate a clock sync processor 762-1 or other fixed logic that uses the clock sync symbols to synchronize a local clock according to an embodiment. In the illustrated embodiment, the clock sync processor 762-1 can be configured as a digital phased locked loop (PLL) for synchronizing the phase of the local clock 325 with the phase of a reference clock (e.g. 315 of FIG. 3A). As shown, the PLL can include a sync pulse generator 802, a phase comparator 804, a low pass filter 806, and an optional frequency divider 808.

In operation, the sync pulse generator 802 can output a sync pulse each time a clock sync symbol is received. In some embodiments, the sync pulse generator 802 can output a sync pulse in response to the symbol decoder 754 writing the clock sync data buffer 760 with a decoded clock sync symbol. In other embodiments, the sync pulse generator 802 can output a sync pulse in response to receiving an interrupt from the symbol decoder 754 when a clock sync symbol is extracted from the symbol stream. In some embodiments, the phase of the sync pulse output can be adjusted by adding a transmit latency associated with the data connection.

The sync pulses that are output by the sync pulse generator 802 can serve as a reference signal for adjusting the phase of the local clock 325. For example, as shown in FIG. 8B, the sync pulse signal 812 can be used as reference signal to adjust the phase of a local clock having a lagging clock output 814-1 or a leading clock output 814-2. As will be readily understood to persons skilled in the art, the phase comparator 804 can generate a phase error signal that compares the phase of the sync pulse output to the phase of the local clock 325 output. The phase error signal can be filtered through the low pass filter 806 and provided to the local clock 325 such that the phase of the local clock output can be gradually adjusted to match the phase of the sync pulse output. The local clock 325 output can be fed back to the phase comparator 804 through an optional divider 808 to adjust the frequency of the clock signal.

Figure 9A:
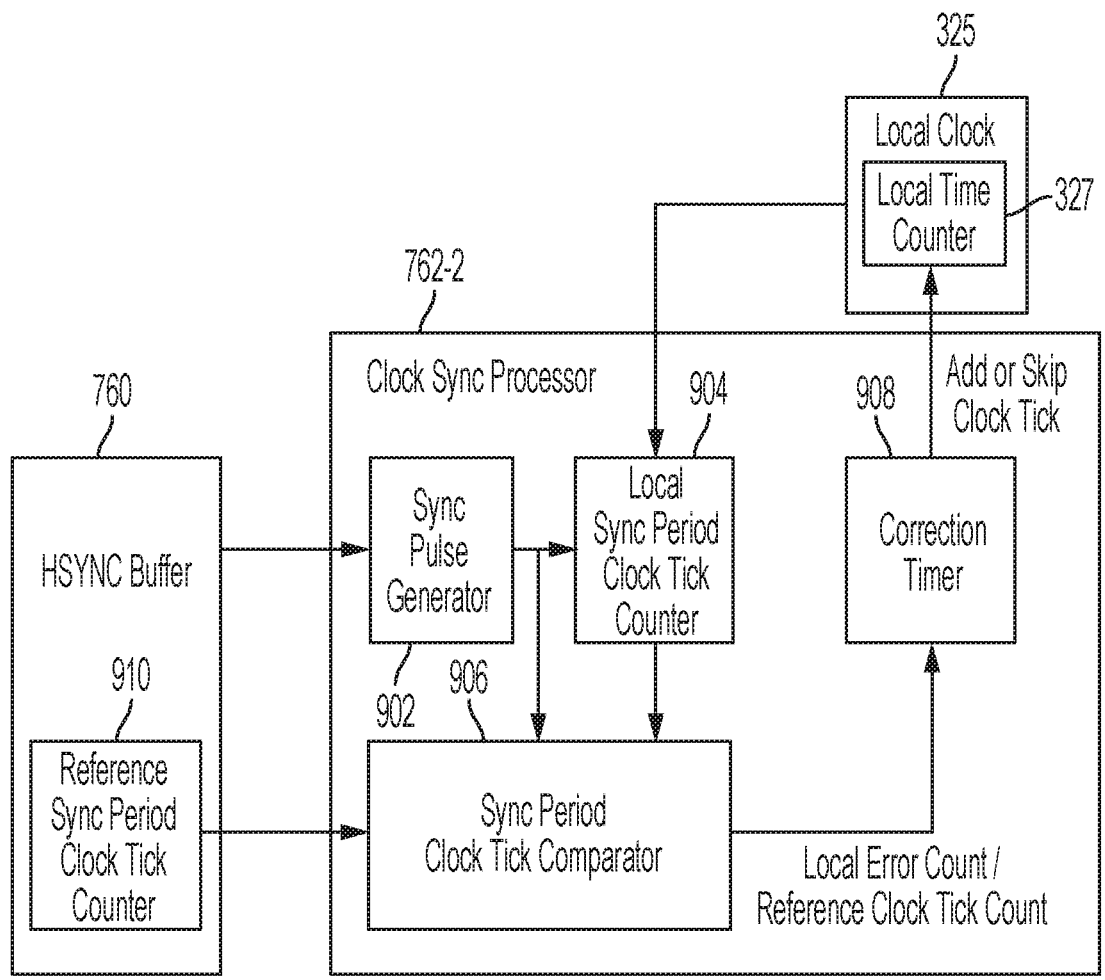

FIGS. 9A and 9B illustrate a clock sync processor 762-2 or other fixed logic that uses clock sync symbols to synchronize a local clock 325 according to another embodiment. In the illustrated embodiment, the primary node (e.g., 310) and each secondary node (e.g., 320) keeps a count of the number of clock ticks (i.e., a clock tick count) during a fixed length sync period (i.e., an HSYNC period). The primary node 310 periodically transmits a reference clock tick count for the sync period in a clock sync symbol (e.g., 410 or 420) to the secondary node 320. In some embodiments, the clock sync processor 762-2 of the secondary node 320 can compare the local clock tick count for the same sync period to the reference count to determine whether the local time counter 327 is faster or slower than the reference time counter 317 and to adjust the local time counter as necessary.

For example, in some embodiments, if the local clock tick count for the sync period is greater than the reference clock tick count, the local time counter 317 can be adjusted to skip one or more clock ticks during the next sync period, effectively slowing down the local time counter. Conversely, if the local tick count for the sync period is less than the reference clock tick count, the local time counter 317 can be adjusted to add one or more clock ticks during the next sync period, effectively speeding up the local time counter. Preferably, the local time counter 327 can be adjusted without changing the frequency or phase of the local clock 325 output. The reference and local clock tick counts can be reset at the start of each new sync period.

As shown in the illustrated embodiment of FIG. 9A, the clock sync processor 762-2 or fixed logic can include a sync pulse generator 902, a local sync period clock tick counter 904, a sync period clock tick comparator 906, and a correction timer 908. When a decoded clock sync symbol (e.g., 410 or 420) is received in the clock sync data buffer (HSYNC buffer) 760, the sync pulse generator 902 generates a sync pulse or other output signal to indicate the end of one sync period and the start of a next sync period. A sync period preferably corresponds to the time period between two clock sync symbols (HSYNC). During a sync period, the local clock tick counter 904 counts the number of clock ticks output by the local clock 325. In response to receiving a sync pulse, the local counter 904 outputs the local clock tick count for the sync period that ended to the comparator 906 and begins counting the clock ticks in the next sync period.

In some embodiments, the clock tick comparator 906 compares the local clock tick count from the local counter 904 to a reference clock tick count 910 from the primary node 310 for the same sync period. In some embodiments, the reference clock tick count 910 can be provided in a clock sync symbol (HSYNC) (e.g., 410 or 420) as encoded time information. Once decoded at the secondary node 420, the reference clock tick count 910 can be provided to the comparator 906 via the clock sync data buffer (HSYNC buffer) 760. In some embodiments, the reference clock tick count can be provided directly from the symbol decoder 754 to the comparator 906.

The comparator 904 can output a local error count and the reference clock tick count to a correction timer 908. The local error count can be the difference between the local clock tick count relative to the reference clock tick count. The correction timer 908 can use the local error count and the reference clock tick count to determine whether to speed up or slow down the local time counter 317 of the local clock 315. Preferably, the correction timer 908 controls the local time counter 317 to add or skip clock ticks during the next sync period. In some embodiments, the correction timer 908 can control the local time counter 317 to add or skip clock ticks during the next sync period at a calculated rate to compensate for the difference in clock ticks during the previous sync period. In some embodiments, the rate at which to add or skip clock ticks can be calculated according to the following equation:

$$\text{truncate}((\text{reference clock tick count}+\text{local error count})/\text{local error count}) \quad (1)$$

FIG. 9B illustrates examples of clock compensation using the embodiment clock sync processor 762-2 of FIG. 9A. In particular, a reference clock tick count 922-1 from a primary node (e.g., 310 of FIG. 3A) is compared to respective local clock tick counts 932-1 and 942-1 of two secondary nodes (e.g., 320-1 and 320-2 of FIG. 3A) for the same sync period 920-1. In a first example, the local clock tick count 932-1 is greater than the reference clock tick count 922-1 for the sync period 920-1. In a second example, the local clock tick count 932-1 is less than the reference clock tick count 922-1 for the sync period 920-1. Specific clock tick counts are provided below for purposes of example only and are not limiting in any way.

In the first example, the reference clock tick count 922-1 for the sync period 920-1 is equal to 10,000 clock ticks, while the local clock tick count 932-1 for the same sync period is equal to 10,100 clock ticks. Thus, the local clock tick count 932-1 leads the reference clock tick count by 100 clock ticks. In order to compensate for this local count error, the correction timer 908 can signal the local time counter 317 to skip 100 clock ticks during the next sync period 920-2 such that the reference count 922-2 and the local count 932-2 are equal or substantially equal by the end of the next sync period. In some embodiments, the correction timer 908 can determine a rate at which the local time counter 317 skips clock ticks such that the clock compensation occurs gradually over the next sync period. As shown in the illustrated example, the correction time 908 can direct the local time counter 317 to skip clock ticks at a rate of once every 100 clock ticks during the next sync period 920-2 using equation (1) (i.e., truncate (10,000+100)/100=100).

In the second example, the local clock tick count 942-1 for the sync period 920-1 lags the reference clock tick count 922-1 by 100 clock ticks (i.e. 9,900 clock ticks). In order to compensate for this local count error, the correction timer 908 can control the local time counter 317 to add 100 clock ticks during the next sync period 920-2 such that the reference count 922-2 and the local count 942-2 are equal or substantially equal by the end of the next sync period. In some embodiments, the correction timer 908 can determine a rate at which the local time counter 317 adds clock ticks such that the clock compensation occurs gradually over the next sync period. As shown in the illustrated example, the correction time 908 can direct the local time counter 317 to add clock ticks at a rate of once every 100 clock ticks during the next sync period 920-2 using equation (1) (i.e., truncate (10,000+100)/100=100).

Figure 10:
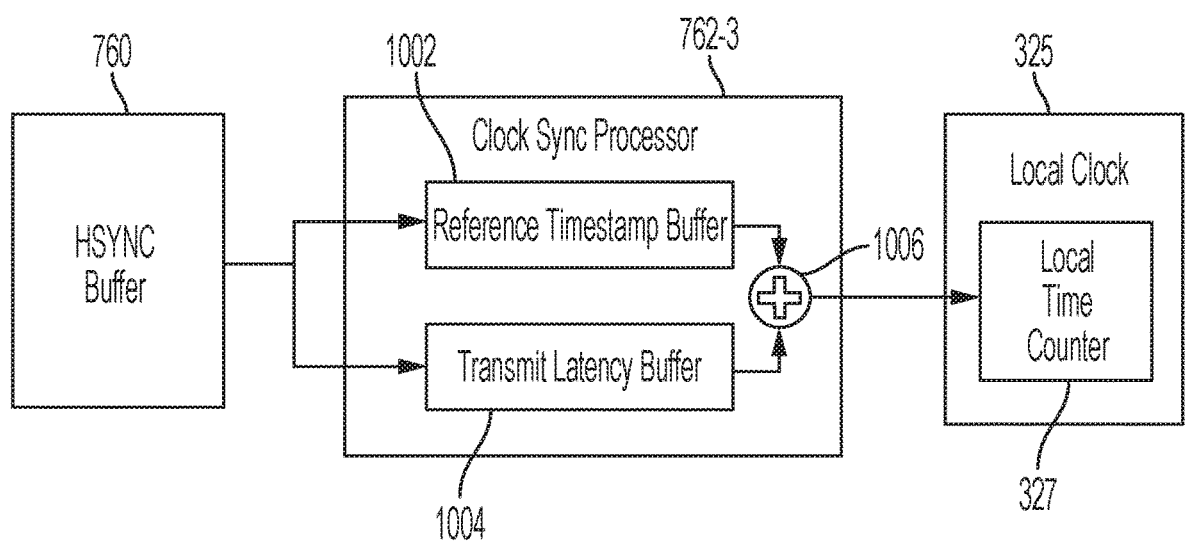
FIG. 10 is a schematic diagram that illustrates a clock sync processor or other fixed logic that uses the clock sync symbols to synchronize a local clock according to still another embodiment.

FIG. 10 illustrates a clock sync processor 762-3 or other fixed logic that can use the clock sync symbols to synchronize a local clock 325 according to still another embodiment. In the illustrated embodiment, the clock sync symbol can provide a reference timestamp for directly overwriting the current timestamp of the local time counter 327. As shown, the clock sync processor or fixed logic 762-3 can include a reference timestamp buffer 1002, a transmit latency buffer 1004, and an arithmetic summer 1006.

In some embodiments, the reference timestamp buffer 1002 can receive a reference timestamp from the clock sync data buffer 760. The transmit latency buffer 1004 can store a transmit latency associated with the data connection over which the clock sync symbol is received. In some embodiments, the transmit latency can be provided to the transmit latency buffer 1004 from the clock sync data buffer 760. Alternatively, the transmit latency can be measured or otherwise calculated by the secondary node itself. The arithmetic summer 1006 can add the transmit latency to the reference timestamps from the buffers 1002 and 1004 to generate a latency-adjusted reference timestamp. In some embodiments, the latency-adjusted reference timestamp can simply overwrite the local timestamp in the counter 327. Alternatively, in some embodiments, the local timestamp in the counter 327 can be adjusted to the nearest agreed upon unit of time (e.g., one microsecond).

As discussed above in connection with FIGS. 5A and 5B, the clock sync symbols can be transmitted at regular intervals, irregular intervals, or at any arbitrary locations within a symbol stream. Accordingly, in some embodiments, the clock sync processors described above (e.g., 762-1, 762-2, and 762-3) can tolerate occasional errors or missing clock sync symbols (HSYNC) in a symbol stream.

In some embodiments, a primary node (e.g., 310) can be configured to operate with respect to any secondary node (e.g., 320) in a "compatibility mode" or a "custom mode". In compatibility mode, the primary node 310 can transmit clock sync symbols (e.g., HSYNC) or other custom symbols for the purpose of discovering whether a secondary node 320 is capable of performing enhanced physical layer processing, including any of the high resolution clock synchronization techniques described above. In compatibility mode, the clock sync symbols (HSYNC) are preferably transmitted between symbol-encoded frames or in place of idle or other control symbols (i.e., not in the middle of a symbol-encoded frame). Accordingly, a secondary node that does not recognize clock sync symbols (HSYNC) can simply discard them and avoid the risk of possible data receive errors. If the secondary node 320 sends a positive acknowledgment of a clock sync symbol (e.g., HSYNC-Ack), the primary node 310 and the secondary node 320 can enter into "custom mode" for the purpose of performing high resolution clock synchronization and/or other enhanced physical layer processing. In some embodiments, the primary node 310 and the secondary node 320 can transition back to "compatibility mode" in the event that the secondary node stops sending positive acknowledgements for the clock sync symbols (HSYNC).

Figure 11:
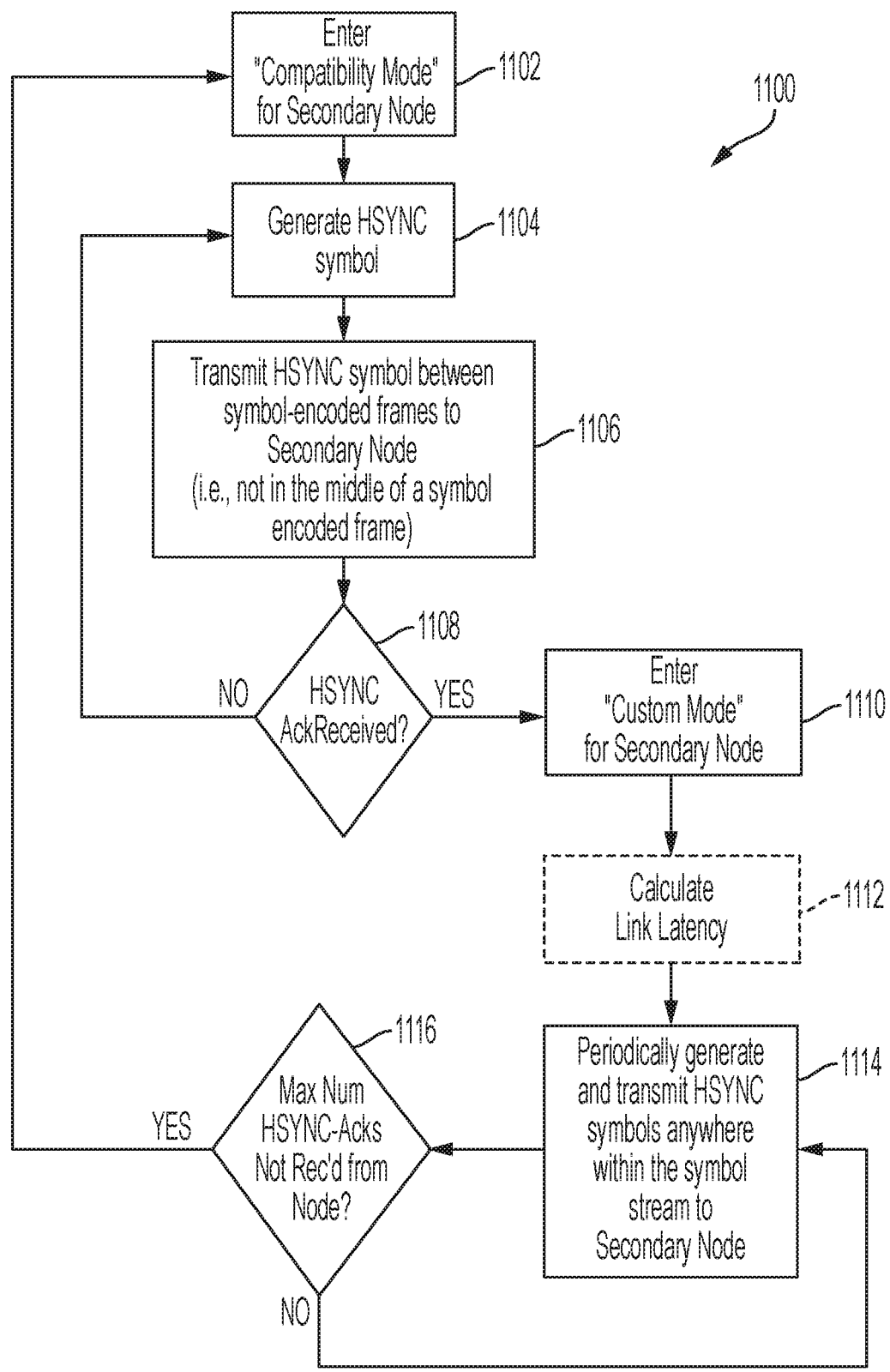
FIG. 11 is a flow diagram that illustrates a process for operating a primary node in a compatibility mode or a custom mode with respect to a secondary node according to an embodiment.

FIG. 11 is a flow diagram that illustrates a process for operating a primary node with respect to a secondary node in a compatibility mode or a custom mode according to an embodiment. In some embodiments, the process 1100 can be performed by a processor or any fixed logic of a primary node 310 (e.g., Mesh Node 200 of FIG. 2).

At block 1102, a primary node 310 processor can enter a compatibility mode with respect to one or more secondary nodes 320. As described below, when operating in compatibility mode, the primary node 310 processor communicates with a secondary node 320 to determine whether the node is capable of performing enhanced physical layer processing, including any of the high resolution clock synchronization methods described herein. In some embodiments, the primary node 310 processor can enter into the compatibility mode when the node initially starts up (e.g., at boot time), when a link or other data connection is activated, and/or periodically during normal operation.

At block 1104, the primary node 310 processor can generate a clock sync symbol (HSYNC) (e.g., 410 or 420) or other custom physical layer symbol. As previously discussed in connection with FIGS. 4A and 4B, the clock sync symbol can include one or more 64/66 bit encoded symbols or one or more 8/10 bit encoded symbols.

At block 1106, the primary node 310 processor can transmit the clock sync symbol to the secondary node 320. In some embodiments, the clock sync symbol can be transmitted between symbol-encoded data frames (i.e., not in the middle of a symbol-encoded data frame). For example, in some embodiments, the clock sync symbol can replace an idle, comma, or other control symbol. Alternatively or additionally, the clock sync symbol can be inserted at a symbol boundary of a control symbol (e.g., before or after an idle, comma or other control symbol). Thus, nodes that cannot detect and process clock sync symbols can simply discard the clock sync symbols without affecting the processing of the rest of the symbol stream.

At determination block 1108, the primary node 310 processor can wait for an acknowledgement of the clock sync symbol (i.e., HSYNC-Ack) from the secondary node 320. If the secondary node receiving the clock sync symbol is capable of detecting and processing clock sync symbols, the secondary node can transmit a positive acknowledgement HSYNC-Ack. In some embodiments, the positive acknowledgement can be a physical layer control symbol that includes one of the reserved control codes. For example, a 66/64 bit encoded acknowledgement symbol can include one of the 8-bit reserved sequence codes in the TYPE field of the symbol. An 8/10 bit encoded acknowledged symbol can be a 10 bit reserved sequence code.

In the event that the primary node 310 processor does not receive a positive acknowledgement (i.e., HSYNC-Ack) from the secondary node (i.e., determination block 1108==NO), the processor can remain in compatibility mode and repeat blocks 1104 and 1106 until a positive acknowledge is received. Alternatively, in some embodiments, the processor can remain in compatibility mode until a maximum retry count is exceeded or a maximum timeout expires.

In the event that the primary node 310 processor receives a positive acknowledgment (i.e., HSYNC-Ack) from the secondary node (i.e., determination block 1108==YES), the processor can transition from compatibility mode into a custom mode to perform any of the example high resolution clock synchronization methods described herein and/or any other enhanced physical layer processing with respect to that node at block 1110. When in custom mode, the primary node 310 processor can proceed to optional block 1112 and block 1114 for the secondary node 320, as well as any other secondary nodes that acknowledge receipt of a clock sync symbol.

In some embodiments, at optional block 1112, the primary node 310 processor can measure or calculate a transmit latency associated with the data connection between the primary node 310 and the secondary node 320. For example, in some embodiments, the transmit latency can be calculated to be about half of a round trip time to receive the clock sync acknowledgment from each secondary node after transmission of the clock sync symbol from the primary node in discovery mode.

At block 1114, the primary node 310 processor can periodically transmit clock sync symbols (e.g., clock sync symbols 530 of FIG. 5A) to the secondary node 320 in custom mode. Unlike compatibility mode, transmission of the clock sync symbols can be transmitted at any symbol location within a symbol stream, e.g., as described above in connection with FIGS. 6A-6D.

In some embodiments, the secondary node 320 can be configured to a send a positive acknowledgement for every received clock sync symbol (HSYNC) back to the primary node 310 in custom mode. At determination block 1116, the primary node 310 processor can determine if a maximum number of positive acknowledgments (i.e., HSYNC-Acks) have not been received from the secondary node 320. In the event that the maximum number of missing acknowledgements is reached (i.e., determination block 1116==YES), the primary node 310 processor can transition from custom mode back to compatibility mode at block 1102 for that node. Accordingly, the primary node 310 processor can repeat blocks 1104, 1106, and 1108 until the secondary node 320 starts acknowledging the clock sync symbols (HSYNC) again.

Further Implementation Options

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices. Network interface(s) allow connections to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include one or more read only memory devices (ROMs); random access memory devices (RAMs); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Therefore, while this invention has been particularly shown and described with references to example embodiments thereof, it will be understood by those skilled in the art that various changes in form and details may be made therein without departing from the scope of the invention as encompassed by the appended claims.

What is claimed is:

1. A method of clock synchronization, comprising:
generating, by a primary node, a clock sync symbol based on an output of a reference clock of the primary node;
generating, by the primary node, a symbol stream for transmission over a data connection to a secondary node, wherein the generated symbol stream includes a plurality of symbol encoded frames, the generated symbol stream further including one or more control symbols located between any two symbol encoded frames;
inserting, by the primary node, the clock sync symbol at any arbitrary symbol location within the generated symbol stream; and
transmitting, by the primary node, the generated symbol stream including the inserted clock sync symbol over the data connection to the secondary node,
wherein the clock sync symbol is added between two consecutive symbols of the generated symbol stream when the clock sync symbol is inserted at an arbitrary symbol location within a symbol encoded frame, and
wherein the clock sync symbol replaces a symbol of the generated symbol stream when the clock sync symbol is inserted at an arbitrary symbol location among the one or more control symbols between the any two symbol ended frames.

2. The method of claim 1, wherein the clock sync symbol is added between the two consecutive symbols of the symbol encoded frame without recalculating an error-detecting code of the symbol encoded frame.

3. The method of claim 1, wherein inserting the clock sync symbol at any arbitrary symbol location within the symbol stream further comprises inserting a further clock sync symbol at a symbol location adjacent to a start of a symbol encoded frame or adjacent to an end of the symbol encoded frame.

4. The method of claim 1, wherein transmission of the symbol replaced by the clock sync symbol is suppressed at the arbitrary symbol location between the any two symbol encoded frames.

5. The method of claim 1, further comprising:
receiving, by the secondary node, the symbol stream from the data connection;

extracting, by the secondary node, the clock sync symbol from the symbol stream;
synchronizing, by the secondary node, a local clock of the secondary node to the reference clock of the primary node based on the extracted clock sync symbol.

6. The method of claim 5, wherein synchronizing the local clock of the secondary node with the reference clock of the primary node comprises:
generating a sync pulse;
determining a phase error between the sync pulse and a clock pulse of the local clock; and
adjusting a phase of a next clock pulse of the local clock based on the determined phase error.

7. The method of claim 6, wherein generating the sync pulse comprises adjusting a phase of the sync pulse based on a transmit latency associated with the data connection.

8. The method of claim 5, wherein the clock sync symbol encodes time information based on an output of the reference clock, and wherein synchronizing the local clock of the secondary node to the reference clock of the primary node comprises adjusting a local time counter based on the time information encoded in the clock sync symbol.

9. The method of claim 8, wherein adjusting the local time counter of the local clock comprises adding or skipping one or more clock ticks to the local time counter.

10. The method of claim 8, wherein the time information includes a reference timestamp and wherein adjusting the local time counter of the local clock comprises overwriting the local time counter with the reference timestamp.

11. The method of claim 10, further comprising further adjusting the local time counter based on the reference timestamp and a transmit latency associated with the data connection.

12. The method of claim 5, wherein the local time counter of the local clock is synchronized to have a clock tick accuracy in a range of zero to ten clock ticks of a reference time counter of the reference clock.

13. The method of claim 1, wherein the clock sync symbol is at least one of a 64/66 bit encoded symbol and an 8/10 bit encoded symbol.

14. The method of claim 1, further comprising:
generating, by the primary node, a plurality of symbol streams for transmission over a plurality of data connections to a plurality of respective secondary nodes; and
inserting, by the primary node, the clock sync symbol at an any arbitrary symbol location within each symbol stream for transmission to each secondary node.

15. The method of claim 1, further comprising:
generating, by a further primary node, a further clock sync symbol based on an output of a reference clock of the further primary node;
generating, by the further primary node, a further symbol stream for transmission over a data connection; and
inserting, by the further primary node, the further clock sync symbol at any arbitrary symbol location within the further symbol stream during transmission over the data connection.

16. The method of claim 15, further comprising:
receiving, by the secondary node, the clock sync symbol from the primary node and the further clock sync symbol from the further primary node; and
synchronizing, by the secondary node, a local clock of the secondary node using one of the clock sync symbol and the further clock sync symbol that is selected based on preconfigured priorities of the primary node and the at least one further primary node.

17. The method of claim 1, further comprising:
waiting, by the primary node, for an acknowledgment of the clock sync symbol from the secondary node during a compatibility mode; and
continuing to generate and insert clock sync symbols into symbol streams transmitted over the data connection to the secondary node only in response to receiving the acknowledgment of the clock sync symbol.

18. The method of claim 17, further comprising:
measuring a transmit latency associated with the data connection based on a delay between transmitting the clock sync symbol over the data connection and receiving the acknowledgment from the secondary node.

19. The method of claim 1, wherein the symbol that is replaced by the clock sync symbol is any of an idle symbol or a comma symbol.

20. A clock synchronization system, comprising:
a primary node comprising a reference clock and a processor that executes a transmit engine,
wherein the transmit engine is executed to generate a clock sync symbol from an output of the reference clock, generate a symbol stream that includes a plurality of symbol encoded frames and one or more control symbols located between any two symbol encoded frames, insert the clock sync symbol at any arbitrary symbol location within the generated symbol stream, and transmit the generated symbol stream including the inserted clock sync symbol over a data connection to a secondary node,
wherein the clock sync symbol is added between two consecutive symbols of the generated symbol stream when the clock sync symbol is inserted at an arbitrary symbol location within a symbol encoded frame, and
wherein the clock sync symbol replaces a symbol of the generated symbol stream when the clock sync symbol is inserted at an arbitrary symbol location among the one or more control symbols between the any two symbol ended frames.

21. The clock synchronization system of claim 20, wherein the transmit engine inserts a further clock sync symbol at a symbol location adjacent to a start of a symbol encoded frame or adjacent to an end of the symbol encoded frame.

22. The clock synchronization system of claim 21, wherein the transmit engine is a modified physical coding sublayer (PCS) transmit engine and the receive engine is a modified PCS receive engine.

23. The clock synchronization system of claim 20, wherein the transmit engine suppresses transmission of the symbol replaced by the clock sync symbol at the arbitrary symbol location between the any two symbol encoded frames.

24. The clock synchronization system of claim 20, further comprising:
a secondary node comprising a local clock and a processor that executes a receive engine,
wherein the receive engine is executed to receive the symbol stream from the data connection, extract the clock sync symbol from the symbol stream, and synchronize the local clock of the second node with the reference clock of the primary node based on the extracted clock sync symbol.

25. The clock synchronization system of claim 24, wherein to synchronize the local clock of the secondary node with the reference clock of the primary node, the receive engine generates a sync pulse, determines a phase error between the sync pulse and a clock pulse of the local clock, and adjusts a phase of a next clock pulse of the local clock based on the determined phase error.

26. The clock synchronization system of claim 25, wherein the receive engine adjusts a phase of the sync pulse based on a transmit latency associated with the data connection.

27. The clock synchronization system of claim 24, wherein the clock sync symbol encodes time information based on an output of the reference clock, and wherein the receive engine adjusts a local time counter of the local clock based on the time information encoded in the clock sync symbol.

28. The clock synchronization system of claim 27, wherein the local time counter of the local clock is adjusted by adding or skipping one or more clock ticks.

29. The clock synchronization system of claim 27, wherein the time information includes a reference timestamp and wherein the local time counter is adjusted by overwriting the local time counter with the reference timestamp.

30. The clock synchronization system of claim 29, wherein the receive engine further adjusts the local timestamp of the local clock based on the reference timestamp and a transmit latency associated with the data connection.

31. The clock synchronization system of claim 20, wherein the clock sync symbol is at least one of a 64/66 bit encoded symbol and an 8/10 bit encoded symbol.

32. The clock synchronization system of claim 20, wherein the symbol that is replaced by the clock sync symbol is any of an idle symbol or a comma symbol.

* * * * *